(12) United States Patent
Shan et al.

(10) Patent No.: US 11,076,420 B2
(45) Date of Patent: Jul. 27, 2021

(54) RESOURCE SCHEDULING METHOD AND APPARATUS USING ACCESS CHANNEL RESOURCE PERIOD IDENTIFIER

(71) Applicant: HUAWEI TECHNOLOGIES CO., LTD., Guangdong (CN)

(72) Inventors: Baokun Shan, Beijing (CN); Yinghui Yu, Beijing (CN); Li Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/148,818

(22) Filed: Oct. 1, 2018

(65) Prior Publication Data
US 2019/0037594 A1 Jan. 31, 2019

Related U.S. Application Data

(63) Continuation of application No. PCT/CN2016/104527, filed on Nov. 4, 2016.

(30) Foreign Application Priority Data

Apr. 1, 2016 (WO) ................ PCT/CN2016/078381
Jun. 13, 2016 (WO) ................ PCT/CN2016/085614

(51) Int. Cl.
*H04W 4/00* (2018.01)
*H04W 74/00* (2009.01)
(Continued)

(52) U.S. Cl.
CPC ......... *H04W 74/004* (2013.01); *H04W 48/08* (2013.01); *H04W 72/1268* (2013.01);
(Continued)

(58) Field of Classification Search
CPC . H04W 74/04; H04W 48/08; H04W 72/1268; H04W 74/006; H04W 74/0833; H04W 56/00
See application file for complete search history.

(56) References Cited

U.S. PATENT DOCUMENTS

2011/0078453 A1* 3/2011 Mueck ................ H04L 9/0838
713/179
2012/0300714 A1* 11/2012 Ng .................... H04W 56/0045
370/329
(Continued)

FOREIGN PATENT DOCUMENTS

| CN | 101378286 A | 3/2009 |
| CN | 102158894 A | 8/2011 |

(Continued)

OTHER PUBLICATIONS

XP051055213 R2-161271 Samsung,"RA-RNTI calculation in Rel-13 low complexity MTC",3GPP TSG-RAN WG2 Meeting #93,Feb. 15-19, 2016, St. Julians, Malta,total 5 pages.
(Continued)

*Primary Examiner* — Abdelnabi O Musa
(74) *Attorney, Agent, or Firm* — Leydig, Voit & Mayer, Ltd.

(57) ABSTRACT

Embodiments of this application disclose a resource scheduling method, an access network device, and user equipment, to reduce a quantity of times of applying for an uplink resource by using a random access process, reduce additional signaling overheads brought to the user equipment, and reduce power consumption of the user equipment. The method part in the embodiments of this application includes: determining, by an access network device, a target time interval in which user equipment monitors a downlink control channel; and sending, by the access network device,
(Continued)

uplink resource scheduling information to the user equipment by using the downlink control channel in the target time interval.

17 Claims, 12 Drawing Sheets

(51) Int. Cl.
  *H04W 48/08* (2009.01)
  *H04W 72/12* (2009.01)
  *H04W 74/08* (2009.01)
  *H04W 52/02* (2009.01)

(52) U.S. Cl.
  CPC .... *H04W 72/1289* (2013.01); *H04W 52/0212* (2013.01); *H04W 74/006* (2013.01); *H04W 74/0833* (2013.01); *Y02D 30/70* (2020.08)

(56) References Cited

U.S. PATENT DOCUMENTS

| | | | |
|---|---|---|---|
| 2013/0148607 A1* | 6/2013 | Yu | H04L 61/103 370/329 |
| 2013/0242730 A1* | 9/2013 | Pelletier | H04W 28/0284 370/230 |
| 2013/0250888 A1* | 9/2013 | Lu | H04W 72/0453 370/329 |
| 2013/0267246 A1* | 10/2013 | Wang | H04W 24/10 455/456.1 |
| 2014/0161070 A1* | 6/2014 | Chang | H04W 74/0858 370/329 |
| 2014/0241234 A1* | 8/2014 | Zhu | H04W 72/005 370/312 |
| 2015/0092563 A1 | 4/2015 | Tabet et al. | |
| 2016/0309519 A1 | 10/2016 | Quan Wei et al. | |
| 2017/0238345 A1* | 8/2017 | Liu | H04W 72/042 370/329 |
| 2017/0303295 A1 | 10/2017 | Wu et al. | |

FOREIGN PATENT DOCUMENTS

| | | |
|---|---|---|
| CN | 102325382 A | 1/2012 |
| CN | 102638880 A | 8/2012 |
| CN | 103037481 A | 4/2013 |
| CN | 103298135 A | 9/2013 |
| CN | 103457710 A | 12/2013 |
| CN | 103747534 A | 4/2014 |
| CN | 105188150 A | 12/2015 |
| EP | 3026830 A1 | 6/2016 |
| WO | 2010150952 A1 | 12/2010 |
| WO | 2015012666 A1 | 1/2015 |
| WO | 2015116732 A1 | 8/2015 |

OTHER PUBLICATIONS

3GPP TS 36.321 V13.1.0 (Mar. 2016),3rd Generation Partnership Project;Technical Specification Group Radio Access Network;Evolved Universal Terrestrial Radio Access (E-UTRA);Medium Access Control (MAC) protocol specification (Release 13),total 85 pages.

3GPP TS 36.212 V13.1.0 (Mar. 2016),3rd Generation Partnership Project;Technical Specification Group Radio Access Network;Evolved Universal Terrestrial Radio Access (E-UTRA);Multiplexing and channel coding(Release 13),total 129 pages.

3GPP TS 36.331 V13.1.0 (Mar. 2016),3rd Generation Partnership Project;Technical Specification Group Radio Access Network;Evolved Universal Terrestrial Radio Access (E-UTRA);Radio Resource Control (RRC);Protocol specification (Release 13),total 551 pages.

R2-161391 ZTE,"Analysis on preamble transmission related issues in NB-IoT",3GPP TSG-RAN WG2 Meeting #93,St. Julians, Malta, Feb. 15-19, 2016,total 6 pages.

3GPP TS 36.413 V13.2.0 (Mar. 2016),3rd Generation Partnership Project;Technical Specification Group Radio Access Network;Evolved Universal Terrestrial Radio Access Network(E-UTRAN);S1 Application Protocol (S1AP)(Release 13), total 321 pages.

"Email discussion report on [92#44][LTE/MTC] MAC Open Items," 3GPP TSG-RAN WG2 #93, R2-161734, St. Julian's, Malta, pp. 1-29, 3rd Generation Partnership Project, Valbonne, France (Feb. 15-19, 2016).

CN/201680084391.7, Office Action, dated Mar. 18, 2020.

* cited by examiner

Existing sub-access response subheader

Existing sub-access response payload

The sub-access response subheader includes a frequency band identifier

The sub-access response payload includes a frequency band identifier

RESOURCE SCHEDULING METHOD AND APPARATUS USING ACCESS CHANNEL RESOURCE PERIOD IDENTIFIER

CROSS-REFERENCE TO RELATED APPLICATIONS

This application is a continuation of International Application No. PCT/CN2016/104527, filed on Nov. 4, 2016, which claims priority to International Application No. PCT/CN2016/078381, filed on Apr. 1, 2016, and International Application No. PCT/CN2016/085614, filed on Jun. 13, 2016. The disclosures of the aforementioned applications are hereby incorporated by reference in their entireties.

TECHNICAL FIELD

This application relates to the field of communications technologies, and in particular, to a resource scheduling method, an access network device, and user equipment.

BACKGROUND

Internet of Things (IoT) is defined as a combination of almost all current technologies and computer and Internet technologies, to implement real-time sharing and intelligent collection, transfer, processing, and execution of environments and real-time status information between objects and objects. In a broad sense, all current applications related to information technologies can be included into the scope of Internet of Things. With rapid development of mobile communications, to cope with future explosive growths in mobile data traffic, massive device connections, and various new services and application scenarios emerging continuously, the $5^{th}$ generation mobile communication system (5G) comes into being. As a component of 5G, Internet of Things also has a growth in market requirements.

As an important branch of Internet of Things, cellular network-based narrowband Internet of Things (NB-IoT) is constructed in a cellular network. To be specific, the cellular network-based narrowband Internet of Things can be directly deployed in a Global System for Mobile Communications (GSM) network, a Universal Mobile Telecommunications System (UMTS) network, or a Long Term Evolution network. Compared with those of a conventional cellular network, services and user equipment on an NB-IoT network have the following features:

(1) Low rate and long cycle of services: Compared with a conventional cellular network, on NB-IoT, data packets generated by services are smaller and generally insensitive to delays.

(2) Requirements on low power consumption: Lower power consumption of user equipment is required, to save battery power of the user equipment and ensure a relatively long standby time of the user equipment.

In the prior art, in an LTE network, when user equipment generates uplink data unpredictable by a base station, the user equipment needs to notify the base station that there is data to be sent. The user equipment may send a buffer status report (BSR) to the base station together with uplink data that is currently transmitted. If there is no uplink data to be sent at this time, the user equipment may send a scheduling request (SR) by using a physical uplink link control channel (PUCCH), to request for an uplink resource to send a BSR to the base station, or apply for an uplink resource by using a random access process.

However, for an NB-IoT network, it may be learned from the foregoing features that, because one user equipment has a relatively small quantity of services, it cannot be ensured that there is uplink data to be transmitted, when a BSR needs to be sent. In addition, to simplify an NB-IoT network architecture, no PUCCH is designed in a current NB-IoT network, in other words, the user equipment cannot send an SR by using a PUCCH, either. Therefore, when the user equipment generates uplink data unpredictable by the base station, it is highly probable that the user equipment needs to apply for an uplink resource by using a random access process. In other words, when the user equipment generates uplink data unpredictable by the base station, for most times, the user equipment applies for an uplink resource by using a random access process. However, executing a random access process causes relatively large signaling overheads, and frequent execution of the random access process causes excessively large signaling overheads of the user equipment, causing excessively high power consumption of the user equipment.

SUMMARY

Embodiments of this application provide a resource scheduling method, an access network device, and user equipment, to reduce a quantity of times of applying for an uplink resource by using a random access process, reduce additional signaling overheads brought to the user equipment, and reduce power consumption of the user equipment.

In view of this, according to a first aspect, an embodiment of this application provides a resource scheduling method: determining, by an access network device, a target time interval in which user equipment monitors a downlink control channel; and sending uplink resource scheduling information to the user equipment by using the downlink control channel in the target time interval.

In this embodiment of this application, the access network device may first determine the target time interval in which the user equipment monitors the downlink control channel, and then schedule an uplink resource for the user equipment in the target time interval. In other words, when the user equipment generates data unpredictable by the access network device, the user equipment may send the unpredictable data on the uplink resource scheduled by the access network device for the user equipment in the target time interval, so that a quantity of times of applying for an uplink resource by using a random access process is reduced, additional signaling overheads brought to the user equipment are reduced, and power consumption of the user equipment is reduced.

In a possible design, after the access network device sends the uplink resource scheduling information to the user equipment by using the downlink control channel in the target time interval, the access network device may monitor an uplink resource indicated by the uplink resource scheduling information; and if the access network device does not receive, on the uplink resource, data sent by the user equipment, the access network device skips re-sending the uplink resource scheduling information to the user equipment, so that signaling overheads of the access network device can be reduced and load of the access network device can be reduced.

In a possible design, the determining, by an access network device, a target time interval in which user equipment monitors a downlink control channel may be specifically performed in the following manner: determining whether the user equipment is in a connected state, where the access network device may further determine whether the user equipment is in a discontinuous reception state; and if the access network device determines that the user equipment is not in the discontinuous reception state, using a time segment in which the downlink control channel is monitored as the target time interval.

In a possible design, if determining that the user equipment is in the discontinuous reception state, the access network device may determine an on-duration timer timing segment of the user equipment, where the target time interval is the on-duration timer timing segment.

In a possible design, if determining that the user equipment is in the discontinuous reception state, the access network device determines an inactivity timer timing segment of the user equipment, where the target time interval is the inactivity timer timing segment.

In a possible design, the sending, by the access network device, uplink resource scheduling information to the user equipment by using the downlink control channel in the target time interval may be specifically: sending first downlink resource scheduling information to the user equipment by using a PDCCH in the inactivity timer timing segment, and sending the uplink resource scheduling information at the same time, where the first downlink resource scheduling information is scheduling information of a data block that includes a first target protocol data unit, and the first target protocol data unit is a last protocol data unit in downlink data that is sent by the access network device to the user equipment.

In a possible design, the first target protocol data unit may be a radio link control (RLC) protocol data unit.

In a possible design, before the access network device determines the inactivity timer timing segment of the user equipment, the access network device may send second downlink resource scheduling information to the user equipment by using the PDCCH, where the second downlink resource scheduling information is scheduling information of a data block that includes a second target protocol data unit, and the second target protocol data unit is a last protocol data unit in downlink data that is sent by the access network device to the user equipment; and after receiving an answer message fed back by the user equipment, the access network device may send, before the inactivity timer expires, the uplink resource scheduling information to the user equipment by using the PDCCH, where the answer message is fed back by the user equipment after receiving the second target protocol data unit.

In a possible design, the second target protocol data unit may be an RLC protocol data unit.

In a possible design, the access network device may determine a paging cycle of the user equipment when the user equipment is in an idle state, where an awake phase in the paging cycle is the target time interval; the access network device determines a target paging occasion in the awake phase, where the target paging occasion includes one or more paging occasions in the awake phase; and the access network device sends a target paging message to the user equipment on the target paging occasion, where the target paging message includes the uplink resource scheduling information.

According to a second aspect, an embodiment of this application provides a resource scheduling method: determining, by user equipment, whether the user equipment generates specific uplink data, and if the user equipment generates the specific uplink data, enabling a specific timer; and if the user equipment receives, before the specific timer expires, uplink resource scheduling information sent by an access network device, sending, by the user equipment, target data to the access network device on an uplink resource indicated by the uplink resource scheduling information, where the uplink resource scheduling information is sent by the access network device by using a downlink control channel in a target time interval, and the target time interval is a time segment in which the user equipment monitors the downlink control channel.

In this embodiment of this application, when the user equipment generates data unpredictable by the access network device, the user equipment may send the unpredictable data on an uplink resource scheduled by the access network device for the user equipment in the target time interval, so that a quantity of times of applying for an uplink resource by using a random access process can be effectively reduced, additional signaling overheads brought to the user equipment can be reduced, and power consumption of the user equipment can be reduced.

In a possible design, the user equipment may send the specific uplink data, or an SR, or a BSR to the access network device on the uplink resource indicated by the uplink resource scheduling information.

In a possible design, if the user equipment does not generate the specific uplink data, but receives the uplink resource scheduling information, the user equipment skips providing feedback to the uplink resource scheduling information. In actual application, power consumption of the user equipment can further be reduced.

According to a third aspect, an embodiment of this application provides a resource scheduling method receiving, by an access network device, an access request that is sent by user equipment by using an access channel resource, and determining an access identifier based on at least one of frequency information and time information of the access channel resource, where the frequency information includes at least one of a frequency band identifier and a carrier identifier; and the time information includes at least one of an access channel resource period identifier, a system hyper frame number, and a system frame number; and sending, by the access network device, scheduling information of an access response to the user equipment based on the access identifier, so that the user equipment receives the access response on a resource indicated by the scheduling information.

In a possible design, the access network device may determine the access identifier according to the following formula:

$$\text{RA-RNTI}=1+\text{band\_id}+x*\text{Period\_id, where}$$

RA-RNTI is the access identifier, band_id is the frequency band identifier, and Period_id is the access channel resource period identifier; and x is a positive integer, and x is greater than or equal to a maximum value of (1+band_id).

In a possible design, the access network device may determine the access identifier according to the following formula:

$$\text{RA-RNTI}=1+\text{band\_id}+x*(\text{HSFN mod } y)+x*y*\text{Period\_id, where}$$

RA-RNTI is the access identifier, band_id is the frequency band identifier, HSFN is the system hyper frame number, and Period_id is the access channel resource period identifier; and x is a positive integer, x is greater than or equal to a maximum value of (1+band_id), and y is a quantity of system hyper frames that are covered by a maximum access response receiving window length supported by an access network.

In a possible design, the access network device may further determine the access identifier according to the following formula:

$$\text{RA-RNTI}=1+(\text{HSFN mod } y)+y*\text{Period\_id, where}$$

HSFN is the system hyper frame number, y is a quantity of system hyper frames that are covered by a maximum access response receiving window length supported by an access network, and Period_id is the access channel resource period identifier.

In a possible design, the access network device may determine the access channel resource period identifier according to the following formula:

$$\text{Period\_id}=\text{floor}(\text{SFN/Period}), \text{ where}$$

Period_id is the access channel resource period identifier, SFN is a system frame number, and Period is an access channel resource period; and the access channel resource period is a minimum access channel resource period supported by the access network, a minimum access channel resource period that is currently activated by the access network device, or an access channel resource period corresponding to a coverage level of the user equipment.

In a possible design, the access network device may determine y according to the following formula:

$$y=\text{floor}(\text{Wmax/HSF-Length})+1, \text{ where}$$

Wmax is a maximum access response receiving window length, and HSF-Length is a system hyper frame length.

In a possible design, after the access network device sends the scheduling information of the access response to the user equipment based on the access identifier, the access network device sends the access response based on the scheduling information, where the access response includes the frequency band identifier. It should be noted that, the frequency band identifier may be included in a message header of the access response or a message payload of the access response.

In a possible design, the frequency band identifier is a system narrowband identifier.

According to a fourth aspect, an embodiment of this application provides a resource scheduling method, including: sending, by user equipment, an access request to an access network device by using an access channel resource; and determining, by the user equipment, an access identifier based on at least one of time information and frequency information of the access channel resource, where the frequency information includes at least one of a frequency band identifier and a carrier identifier, and the time information includes at least one of an access channel resource period identifier, a system hyper frame number, and a system frame number; and receiving, by the user equipment based on the access identifier, scheduling information that is of an access response and that is sent by the access network device, where the scheduling information is determined by the access network device after receiving the access request.

In a possible design, the user equipment determines the access identifier according to the following formula:

$$\text{RA-RNTI}=1+\text{band\_id}+x*\text{Period\_id}, \text{ where}$$

RA-RNTI is the access identifier, band_id is the frequency band identifier, and Period_id is the access channel resource period identifier; and x is a positive integer, x is greater than or equal to a maximum value of (1+band_id).

In a possible design, the user equipment determines the access identifier according to the following formula:

$$\text{RA-RNTI}=1+\text{band\_id}+x*(\text{HSFN mod } y)+x*y*\text{Period\_id}, \text{ where}$$

RA-RNTI is the access identifier, band_id is the frequency band identifier, HSFN is the system hyper frame number, and Period_id is the access channel resource period identifier; and x is a positive integer, x is greater than or equal to a maximum value of (1+band_id), and y is a quantity of system hyper frames that are covered by a maximum access response receiving window length supported by an access network.

In a possible design, the determining, by the user equipment, an access identifier based on at least one of time information and frequency information of the access channel resource includes:

determining, by the user equipment, the access identifier according to the following formula:

$$\text{RA-RNTI}=1+(\text{HSFN mod } y)+y*\text{Period\_id}, \text{ where}$$

HSFN is the system hyper frame number, y is a quantity of system hyper frames that are covered by a maximum access response receiving window length supported by an access network, and Period_id is the access channel resource period identifier.

In a possible design, the user equipment determines y according to the following formula:

$$y=\text{floor}(\text{Wmax/HSF-Length})+1, \text{ where}$$

Wmax is a maximum access response receiving window length, and HSF-Length is a system hyper frame length.

In a possible design, the user equipment determines the access channel resource period identifier according to the following formula:

$$\text{Period\_id}=\text{floor}(\text{SFN/Period}), \text{ where}$$

SFN is the system frame number, Period is an access channel resource period, and the access channel resource period is a minimum access channel resource period supported by the access network, a minimum access channel resource period that is currently activated by the access network device, or an access channel resource period corresponding to a coverage level of the user equipment.

In a possible design, after the user equipment receives, based on the access identifier, the scheduling information that is of the access response and that is sent by the access network device, the user equipment receives, based on the scheduling information, the access response sent by the access network device. The access response includes an identifier of a frequency band on which the user equipment sends the access request, and the frequency band identifier may be specifically included in a message header of the access response or a message payload of the access response.

In a possible design, the frequency band identifier is a system narrowband identifier.

According to a fifth aspect, an embodiment of this application provides an access network device, and the access network device has a function of implementing behavior of the access network device in the foregoing method design. The function may be implemented by using hardware, or may be implemented by using hardware by executing corresponding software. The hardware or the software includes one or more modules corresponding to the foregoing function. The module may be software and/or hardware.

In a possible design, the access network device includes a processing module, configured to determine a target time interval in which user equipment monitors a downlink control channel; and a sending module, configured to send uplink resource scheduling information to the user equipment by using the downlink control channel in the target time interval.

In a possible design, a structure of the access network device includes a processor and a transmitter. The processor is configured to determine a target time interval in which user equipment monitors a downlink control channel; and the transmitter is configured to send uplink resource scheduling information to the user equipment by using the downlink control channel in the target time interval.

According to a sixth aspect, an embodiment of this application provides user equipment, and the user equipment has a function of implementing behavior of the user equipment in the foregoing method design. The function may be implemented by using hardware, or may be implemented by using hardware by executing corresponding software. The hardware or the software includes one or more modules corresponding to the foregoing function. The module may be software and/or hardware.

In a possible design, the user equipment includes a processing module, configured to: determine whether the user equipment generates specific uplink data; and if the user equipment generates the specific uplink data, enable a specific timer; and a sending module, configured to: if receiving, before the specific timer expires, uplink resource scheduling information sent by an access network device, send target data to the access network device on an uplink resource indicated by the uplink resource scheduling information, where the uplink resource scheduling information is sent by the access network device by using a downlink control channel in a target time interval, and the target time interval is a time segment in which the user equipment monitors the downlink control channel.

In a possible design, a structure of the user equipment includes a processor and a transmitter. The processor is configured to: determine whether the user equipment generates specific uplink data, and when the user equipment generates the specific uplink data, enable a specific timer; and the transmitter is configured to: if receiving, before the specific timer expires, uplink resource scheduling information sent by an access network device, send target data to the access network device on an uplink resource indicated by the uplink resource scheduling information.

According to a seventh aspect, an embodiment of this application provides an access network device, and the access network device has a function of implementing behavior of the access network device in the foregoing method design. The function may be implemented by using hardware, or may be implemented by using hardware by executing corresponding software. The hardware or the software includes one or more modules corresponding to the foregoing function. The module may be software and/or hardware.

In a possible design, the access network device includes: a receiving module, configured to receive an access request that is sent by user equipment by using an access channel resource; a processing module, configured to determine an access identifier based on at least one of time information and frequency information of the access channel resource, where the frequency information includes at least one of a frequency band identifier and a carrier identifier; the time information includes at least one of an access channel resource period identifier, a system hyper frame number, and a system frame number; and a sending module, configured to send scheduling information of an access response to the user equipment based on the access identifier.

In a possible design, a structure of the access network device includes a processor, a receiver, and a transmitter. The receiver is configured to receive an access request that is sent by user equipment by using an access channel resource; and the processor is configured to determine an access identifier based on at least one of frequency information and time information of the access channel resource, where the frequency information includes at least one of a frequency band identifier and a carrier identifier; and the time information includes at least one of an access channel resource period identifier, a system hyper frame number, and a system frame number. The transmitter is configured to send scheduling information of an access response to the user equipment based on the access identifier.

According to an eighth aspect, an embodiment of this application provides user equipment, and the user equipment has a function of implementing behavior of the user equipment in the foregoing method design according to the fourth aspect. The function may be implemented by using hardware, or may be implemented by using hardware by executing corresponding software. The hardware or the software includes one or more modules corresponding to the foregoing function. The module may be software and/or hardware.

In a possible design, the user equipment includes: a sending module, configured to send an access request to an access network device by using an access channel resource; a module, configured to determine an access identifier based on at least one of frequency information and time information of the access channel resource, where the frequency information includes at least one of a frequency band identifier and a carrier identifier, and the time information includes at least one of an access channel resource period identifier, a system hyper frame number, and a system frame number; and a receiving module, configured to receive, based on the access identifier, scheduling information that is of an access response and that is sent by the access network device, where the scheduling information is determined by the access network device after receiving the access request.

In a possible design, a structure of the user equipment includes a receiver and a transmitter. The transmitter is configured to send an access request to an access network device by using an access channel resource; and the receiver is configured to receive scheduling information that is of an access response and that is sent by the access network device. The scheduling information is sent by the access network device based on the access identifier; the access identifier is determined by the access network device based on frequency information and/or time information of the access channel resource; the frequency information includes at least one of a frequency band identifier and a carrier identifier; and the time information includes at least one of an access channel resource period identifier, a system hyper frame number, and a system frame number.

According to a ninth aspect, an embodiment of this application provides a computer storage medium, the computer storage medium stores program code, and the program code is used to instruct to perform the foregoing methods.

Compared with the prior art, it may be learned from the foregoing technical solutions that, in the embodiments of this application, a base station may determine the target time interval in which the user equipment monitors the PDCCH, and the base station sends the uplink resource scheduling information to the user equipment by using the PDCCH in the target time interval. When the user equipment generates the uplink data unpredictable by the base station, the user equipment may send the uplink data on an uplink resource indicated by the uplink resource scheduling information that is sent by the base station to the user equipment by using the PDCCH in the target time interval, so that a quantity of times of applying for an uplink resource by using a random access process can be reduced, additional signaling overheads brought to the user equipment can be reduced, and power consumption of the user equipment can be reduced.

DESCRIPTION OF EMBODIMENTS

Figure 1:
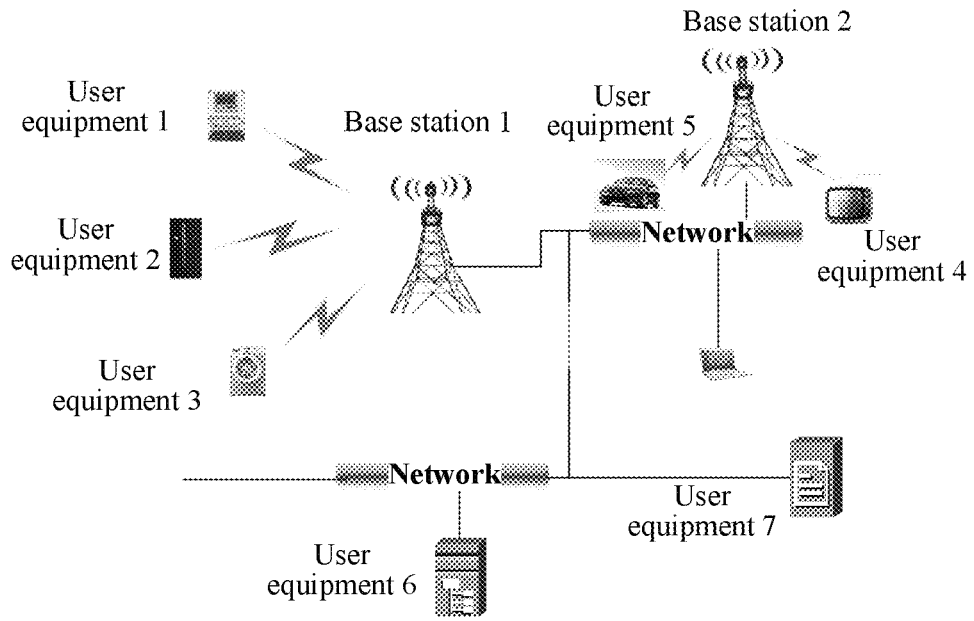
FIG. 1 is a schematic architectural diagram of a system according to an embodiment of this application.

Embodiments of this application provide a resource scheduling method, an access network device, and user equipment, to reduce a quantity of times of applying for an uplink resource by using a random access process, reduce additional signaling overheads brought to the user equipment, and reduce power consumption of the user equipment.

To make persons skilled in the art understand the technical solutions in this application better, the following clearly describes the technical solutions in the embodiments of this application with reference to the accompanying drawings in the embodiments of this application. Apparently, the described embodiments are merely a part rather than all of the embodiments of this application. All other embodiments obtained by persons of ordinary skill in the art based on the embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present application described herein can be implemented in other orders than the order illustrated or described herein. Moreover, the term "include" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be understood that, the technical solutions in the embodiments of this application may be applicable to a wireless communications system that requires low power consumption of terminal devices and low complexity. For example, in a cellular network-based narrowband Internet of Things (NB-IoT) communications system, when user equipment generates uplink data unpredictable by an access network device, the user equipment needs to send an uplink resource request to the access network device. However, in the NB-IoT communications system, manners in which the user equipment sends an uplink resource request to the access network device are highly limited, and the user equipment needs to apply for an uplink resource by performing random access. This requires high power consumption of the user equipment. The technical solutions in the embodiments of this application may be applicable to a wireless communications system in which low power consumption of user equipment and low complexity are required, and manners of sending an uplink resource request to an access network device are limited. This is not limited in this application.

The technical solutions in this application may be applied to various wireless cellular network-based communications systems, for example, a Global System for Mobile communications (GSM), a Code Division Multiple Access (CDMA) system, a Wideband Code Division Multiple Access (WCDMA) system, a general packet radio service (GPRS) system, a Universal Mobile Telecommunications System (UMTS), an LTE system, and a future 5G communications system. This is not limited in this application.

The technical solutions in the embodiments of this application are mainly applied to a narrowband Internet of Things communications system that is based on an LTE system and an evolved system of the LTE system. In a communications system to which the embodiments of this application apply, used network elements are an access network device (also referred to as a network device) and user equipment. The technical solutions of the embodiments of this application may also be applied to another similar wireless communications system that requires low power consumption of user equipment. This is not limited in this application.

In the embodiments of this application, the user equipment may also be user equipment that can perform communication, for example, a terminal device, a mobile station (MS), a mobile terminal, and a refrigerator. The user equipment may communicate with one or more core networks by using a radio access network (RAN). The user equipment may be specifically a device that has a communication function, for example, a vehicle or a refrigerator, which exchanges voice and data with the radio access network. In addition, according to different cellular networks on which the access network device is based, the access network device may be specifically an evolved NodeB (Node B, eNB or e-NodeB), a macro base station, a micro base station, a picocell base station, an access point (AP), a transmission point (TP), or the like in an LTE system and an evolved system of the LTE system. This is not limited in this application. It should be noted that, for ease of description, an application scenario shown in FIG. 1 is described by using an example in which the access network device is a base station.

Referring to FIG. 1, FIG. 1 shows an application scenario to which the solutions provided in this application are applied. The scenario shown in the figure is an application scenario of a cellular network-based physical network communications system. The scenario includes a plurality of user equipments and base stations. It should be noted that quantities of user equipments and base stations shown in the figure are described herein only as an example, but do not constitute a limitation on the solutions in this application. In this scenario, each user equipment shown in the figure may communicate with the base station.

In the scenario shown in FIG. 1, the base station may automatically allocate an uplink resource to the user equipment in some particular time segments. During a specific working process, if the user equipment generates data unpredictable by the base station, and receives uplink resource scheduling information sent by the base station, the user equipment may directly send the data by using the uplink resource automatically allocated by the base station, or send an uplink resource scheduling request to the base station by using the uplink resource automatically allocated by the base station.

In the embodiments of this application, when generating data unpredictable by the access network device, the user equipment may send the data or an uplink resource scheduling request by using an uplink resource automatically allocated by the access network device. Compared with the prior art, during specific application, a quantity of times of applying for an uplink resource by the user equipment by performing a random access process is reduced, excessive signaling overheads of the user equipment are reduced, and a problem of excessively high power consumption of the user equipment is avoided.

The following describes the embodiments of this application in detail with reference to specific examples. It should be noted that, these examples are merely intended to help persons skilled in the art to better understand the embodiments of this application, but not to limit the scope of the embodiments of this application. It may be understood that sequence numbers of processes in methods described below do not mean execution sequences in various embodiments of this application. The execution sequences of the processes should be determined according to functions and internal logic of the processes, and should not be construed as any limitation on implementation processes of the embodiments of this application.

Specifically, in some time in which the user equipment monitors a downlink control channel, the access network device may send uplink resource scheduling information to the user equipment by using the downlink control channel, and automatically allocate some uplink resources to the user equipment. Using an LTE system-based IoT network system as an example, in a time in which the user equipment monitors a PDCCH, the access network device may send resource scheduling information to the user equipment by using the PDCCH. For details, refer to the following embodiments:

Embodiment 1

Figure 2:
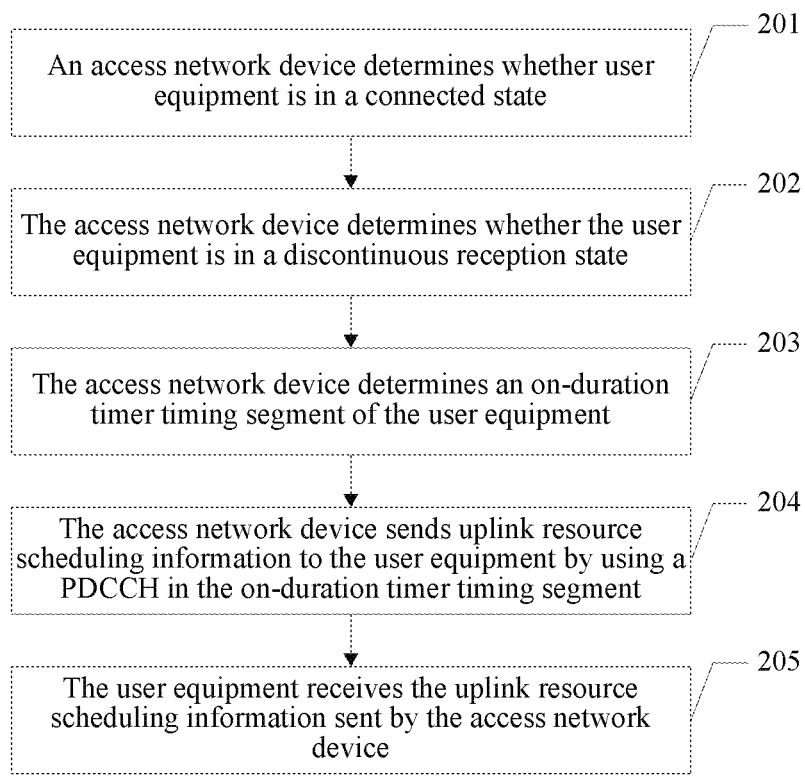
FIG. 2 is a schematic diagram of an embodiment of a resource scheduling method according to embodiments of this application.

According to an resource scheduling method provided in the embodiments of this application, an access network device schedules an uplink resource for user equipment by using a PDCCH in an on-duration timer timing segment when the user equipment is in a discontinuous reception state:

Specifically, referring to FIG. 2, FIG. 2 is a schematic diagram of an embodiment of the resource scheduling method according to the embodiments of this application. The resource scheduling method includes the following steps.

201. An access network device determines whether user equipment is in a connected state.

In this embodiment of this application, the access network device may determine whether the user equipment is in the connected state.

It should be understood that, based on a radio resource control (RRC) protocol layer connection relationship between the user equipment and the access network, the user equipment specifically has two working states: an RRC_Idle state and an RRC_Connected state.

It may be understood that, persons skilled in the art may know that, the access network device may determine, based on a configuration preconfigured by a system, whether the user equipment is in the connected state, that is, whether the user equipment is in the RRC_Connected state. Details are not described herein again.

202. The access network device determines whether the user equipment is in the discontinuous reception state.

In this embodiment of this application, when determining that the user equipment is in the connected state, the access network device may further determine whether the user equipment is in the discontinuous reception state.

It may be understood that, packet-based data flows are usually unexpected. To reduce power consumption of the user equipment, under a discontinuous reception (DRX) working mechanism, when no data is transmitted, the power consumption of the user equipment may be reduced by turning off a receiver circuit of the user equipment, that is, in this case, the user equipment is in a discontinuous working state.

Figure 3:
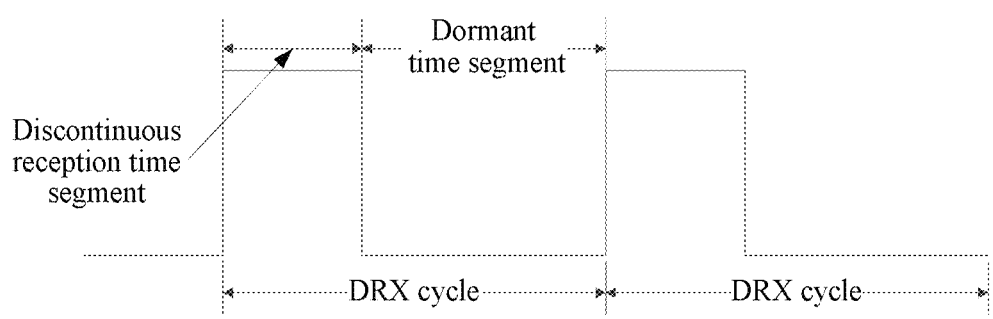
FIG. 3 is a schematic diagram of a discontinuous reception working cycle.

It should be understood that, a basic mechanism of DRX is to configure a DRX cycle for the user equipment in the connected state. The DRX cycle is implemented by an on-duration timer. Specifically, referring to FIG. 3, as shown in FIG. 3, the DRX cycle includes a discontinuous reception time segment and a dormant time segment. In the discontinuous reception time segment, the user equipment monitors and receives a PDCCH and may receive, by using the PDCCH in the discontinuous reception time segment, scheduling information sent by the access network device, and then receives or sends data based on the scheduling information delivered by the access network device. In the dormant time segment, the user equipment does not monitor a PDCCH, that is, does not receive scheduling information on the PDCCH. In other words, in a discontinuous working state, the user equipment periodically sleeps, enables the on-duration timer when waking up, and monitors a PDCCH before the on-duration timer expires.

It should be understood that, parameters related to the DRX cycle, for example, a time when the user equipment enters DRX and an on-duration timer timing segment, are both configured by the access network device for the user equipment when the user equipment accesses a network. In other words, provided that the user equipment receives a DRX enabling instruction, the user equipment enables a DRX working module and enters a DRX working mode based on a specified parameter. The access network device determines whether the user equipment is in the discontinuous reception state based on a preconfigured configuration.

203. The access network device determines an on-duration timer timing segment of the user equipment.

When determining that the user equipment is in the discontinuous working state, the access network device may further determine the on-duration timer timing segment in which the user equipment is in the discontinuous working state.

It should be understood that, the access network device may determine an enabling moment and a timing segment of the on-duration timer based on the preconfigured configuration. In other words, the access network device may determine the on-duration timer timing segment of the user equipment. Details are not described herein again.

204. The access network device sends uplink resource scheduling information to the user equipment by using a PDCCH in the on-duration timer timing segment.

In this embodiment of this application, after determining the on-duration timer timing segment, the access network device may send the uplink resource scheduling information to the user equipment by using the PDCCH in the on-duration timer timing segment.

Figure 4:
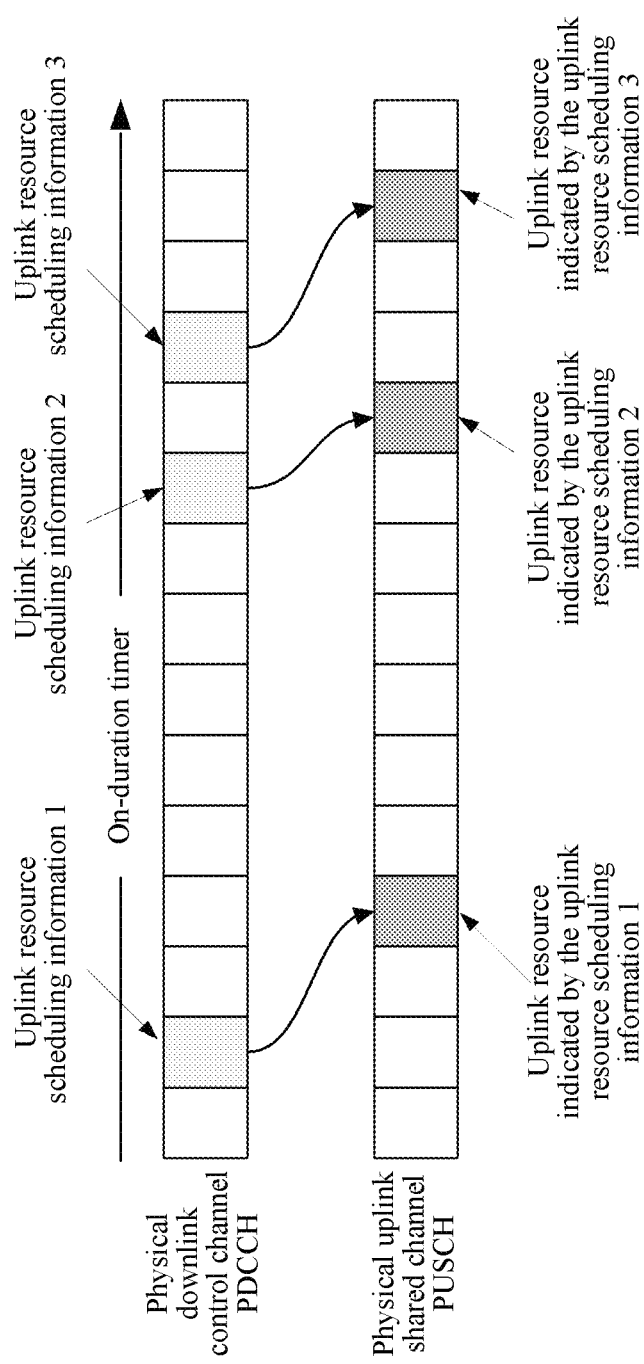
FIG. 4 is a schematic diagram of another embodiment of a resource scheduling method according to embodiments of this application.

For ease of understanding, that the uplink resource scheduling information is sent to the user equipment by using the PDCCH in the on-duration timer timing segment in the embodiments of this application is described by using FIG. 4 as an example. As shown in FIG. 4, FIG. 4 is a schematic diagram showing sending of the uplink resource scheduling information by the access network device to the user equipment in the on-duration timer timing segment.

In FIG. 4, a grid represents that in the on-duration timer timing segment, at a time domain resource location of the PDCCH, the access network device may send uplink resource scheduling information 1, uplink resource scheduling information 2, or uplink resource scheduling information 3 in the on-duration timer timing segment, where the access network device occupies different PDCCH time domain resources in the on-duration timer time length, and may allocate and schedule uplink resources shown in FIG. 4 to the user equipment on a physical uplink shared channel (PUSCH) by using the uplink resource scheduling information 1, the uplink resource scheduling information 2, or the uplink resource scheduling information 3.

It should be noted that, the scheduling manner shown in FIG. 4 is only an example used in this application, and the access network device may further send more than or fewer than three pieces of uplink resource scheduling information in the on-duration timer timing segment, provided that there is an available PDCCH time domain resource in the on-duration timer timing segment when the access network device sends the uplink resource scheduling information. Details are not described herein again.

In other words, in the on-duration timer timing segment, the access network device may add the uplink resource scheduling information to the PDCCH, and send the uplink resource scheduling information to the user equipment by using the PDCCH.

It should be noted that, the access network device may periodically send the uplink resource scheduling information to the user equipment by using the PDCCH. A sending period may be an integer multiple of the DRX cycle, provided that the user equipment is in the on-duration timer timing segment when the access network device sends the uplink resource scheduling information. It should be understood that settings may be performed based on an actual application case, and details are not limited herein.

It should be noted that, when the user equipment is not in the discontinuous working state, the user equipment always monitors the PDCCH, and the access network device may schedule an uplink resource for the user equipment in duration in which the user equipment is not in the discontinuous working state and monitors the PDCCH.

It should be noted that, after the sending, by the access network device, uplink resource scheduling information to the user equipment by using a PDCCH in the on-duration timer timing segment, the resource scheduling method further includes:

monitoring, by the access network device, an uplink resource indicated by the uplink resource scheduling information; and if the access network device does not receive, on the uplink resource, data sent by the user equipment, skipping, by the access network device, re-sending the uplink resource scheduling information to the user equipment.

In the embodiments of this application, when completing sending the uplink resource scheduling information to the user equipment, the access network device monitors the uplink resource indicated by the uplink resource scheduling information, and determines, on the uplink resource, whether there is data sent by the user equipment.

If the access network device does not receive, on the uplink resource indicated by the uplink resource scheduling information, specific uplink data sent by the user equipment, that is, data unpredictable by the access network device, or an SR, or a BSR, the access network device does not repeatedly send the uplink resource scheduling information, that is, the access network device does not repeat scheduling. It should be understood that, in an existing LTE system, when the access network device sends scheduling information to the user equipment, but does not receive any response on a resource scheduled by the scheduling information, the access network device needs to re-send the scheduling information. In this embodiment, the access network device does not repeatedly send the uplink resource scheduling information, avoiding resource waste caused by repeated scheduling when the user equipment does not need an uplink resource.

205. The user equipment receives the uplink resource scheduling information sent by the access network device.

In the embodiments of this application, the user equipment may receive the uplink resource scheduling information sent by the access network device.

It should be understood that, in the embodiments of this application, the user equipment may receive, in the on-duration timer timing segment, the uplink resource scheduling information sent by the access network device.

When the user equipment receives the uplink resource scheduling information, based on whether the user equipment generates specific uplink data, that is, data unpredictable by the access network device, the user equipment may have two different processing methods for the uplink resource scheduling information. For details, refer to FIG. 5.

Figure 5:
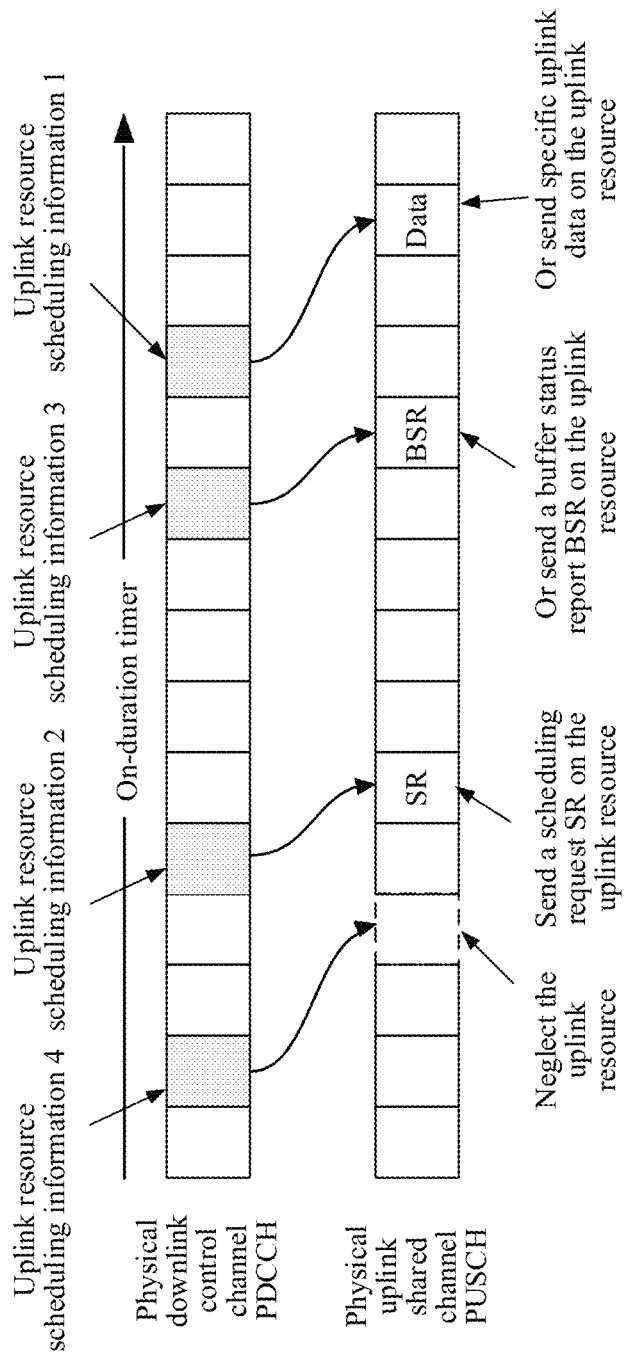
FIG. 5 is a schematic diagram of an embodiment of a resource scheduling method according to embodiments of this application.

In a first method, if the user equipment receives the uplink resource scheduling information, and at this time, the user equipment already generates specific uplink data:

The user equipment may determine whether an uplink resource indicated by the uplink resource scheduling information is sufficient to carry the specific uplink data. If the uplink resource is sufficient to carry the specific uplink data, the user equipment directly sends the specific uplink data to the access network device on the uplink resource indicated by the uplink resource scheduling information. As shown in FIG. 5, if the user equipment receives uplink resource scheduling information 1 and already generates specific uplink data, the user equipment may send the specific uplink data on an uplink resource indicated by the uplink resource scheduling information 1.

If the uplink resource is not sufficient to carry the specific uplink data, the user equipment may send an SR on an uplink resource indicated by the uplink resource scheduling information. As shown in FIG. 5, if the user equipment receives uplink resource scheduling information 2 and already generates specific uplink data, the user equipment sends an SR on an uplink resource indicated by the uplink resource scheduling information 2, to inform the access network device that the specific uplink data needs to be sent, and further request an uplink resource from the access network device.

It should be noted that, how large is an uplink resource scheduled by the access network device for the user equipment based on the SR specifically depends on an implementation. Specifically, a resource sufficient for the user equipment to send a BSR may be scheduled for the user equipment; or a BSR may be directly sent on the uplink resource indicated by the uplink resource scheduling information. As shown in FIG. 5, if the user equipment receives uplink resource scheduling information 3 and already generates specific uplink data, the user equipment may send a BSR on an uplink resource indicated by the uplink resource scheduling information 3. It should be understood that the BSR is information indicating to the access network device that how much data of the user equipment is stored in an uplink buffer and needs to be sent. Therefore, an uplink resource sufficient to carry the specific uplink data generated by the user equipment is requested from the access network device. In other words, the BSR is determined by the user equipment based on a size of the generated specific uplink data.

It should be noted that when the user equipment generates the specific uplink data, the user equipment may enable a specific timer, and the user equipment continuously monitors a PDCCH before the specific timer expires, and determines whether there is uplink resource scheduling information delivered by the access network device.

In a second method, if the user equipment receives the uplink resource scheduling information, and the user equipment does not generate specific uplink data:

The user equipment may neglect the uplink resource scheduling information, and does not provide feedback to the access network device for the uplink resource scheduling information. As shown in a dashed grid in FIG. 5, when the user equipment does not generate specific uplink data, but receives uplink resource scheduling information 4, the user equipment neglects an uplink resource indicated by the uplink resource scheduling information 4.

In the embodiments of this application, the access network device may determine the on-duration timer timing segment in which the user equipment is in the discontinuous reception state, send the uplink resource scheduling information to the user equipment, and schedule the uplink resource for the user equipment. To be specific, when the user equipment generates the uplink data unpredictable by the access network device, the user equipment may directly send the unpredictable uplink data or an SR or a BSR on the uplink resource indicated by the uplink resource scheduling information that is sent by the access network device to the user equipment by using the PDCCH in the on-duration timer timing segment, so that a quantity of times of applying for an uplink resource by using a random access process can be reduced, additional signaling overheads brought to the user equipment can be reduced, and power consumption of the user equipment can be reduced.

Embodiment 2

Figure 6:
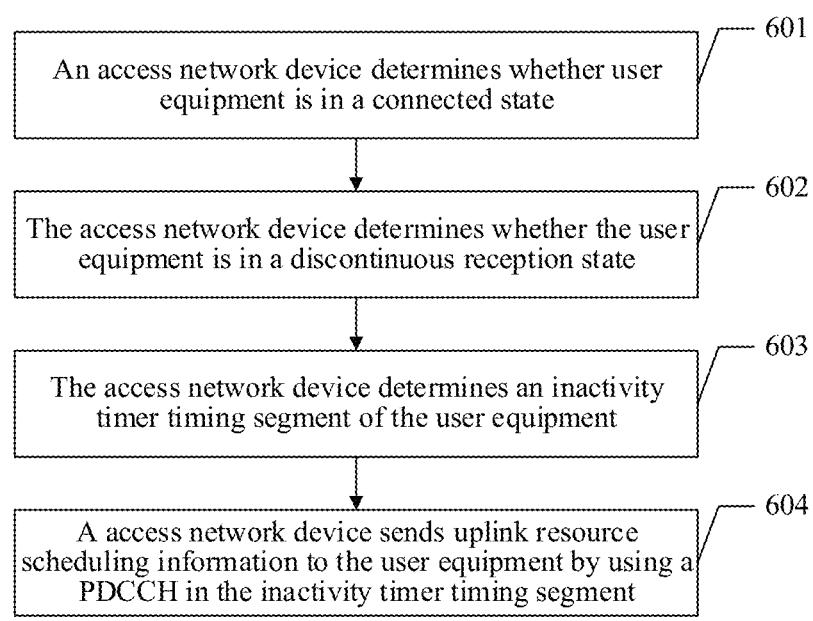
FIG. 6 is a schematic diagram of another embodiment of a resource scheduling method according to embodiments of this application.

According to an resource scheduling method provided in the embodiments of this application, an access network device schedules an uplink resource for user equipment by using a PDCCH in an inactivity timer timing segment when the user equipment is in a discontinuous reception state:

Specifically, referring to FIG. 6, FIG. 6 is a schematic diagram of an embodiment of the resource scheduling method according to the embodiments of this application. A specific implementation process of the resource scheduling method includes the following steps.

Step 601 and step 602 are similar to step 201 and 202 in the foregoing embodiment, and details are not described herein again.

603. The access network device determines an inactivity timer timing segment of the user equipment.

When determining that the user equipment is in a discontinuous working state, the access network device may further determine the inactivity timer timing segment of the user equipment in which the user equipment is in the discontinuous working state.

Figure 7:
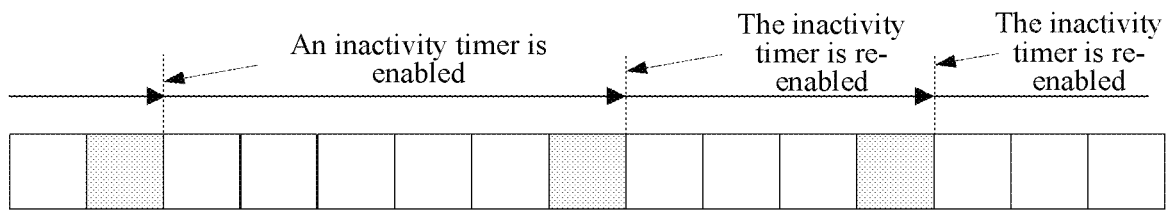
FIG. 7 is a schematic diagram of another embodiment of a resource scheduling method according to embodiments of this application.

It should be understood that, in most cases, when the user equipment is scheduled in a subframe and receives or sends data, the user equipment may be continuously scheduled in the next several subframes. According to a DRX working mechanism, the user equipment may need to receive or send data in a discontinuous reception time segment in a next DRX cycle. In this case, if the data is received or sent in the next DRX cycle, an additional delay is caused. To reduce such type of delay, after the user equipment is scheduled, when the user equipment is scheduled to transmit data, an inactivity timer is enabled, and the user equipment keeps monitoring a PDCCH until the inactivity timer expires. To be specific, as shown in FIG. 7, in an on-duration timer timing segment, when the user equipment successfully receives a PDCCH indicating an uplink data resource or a downlink data resource, the user equipment enables the inactivity timer. In the inactivity timer timing segment, when the user equipment successfully receives a PDCCH indicating an uplink data resource or a downlink data resource, the user equipment re-enables the inactivity timer. In other words, each time the user equipment receives scheduling information delivered by the access network device, the inactivity timer is enabled once.

604. The access network device sends uplink resource scheduling information to the user equipment by using a PDCCH in the inactivity timer timing segment.

In the embodiments of this application, the access network device may send the uplink resource scheduling information to the user equipment by using the PDCCH in the inactivity timer timing segment.

Figure 8:
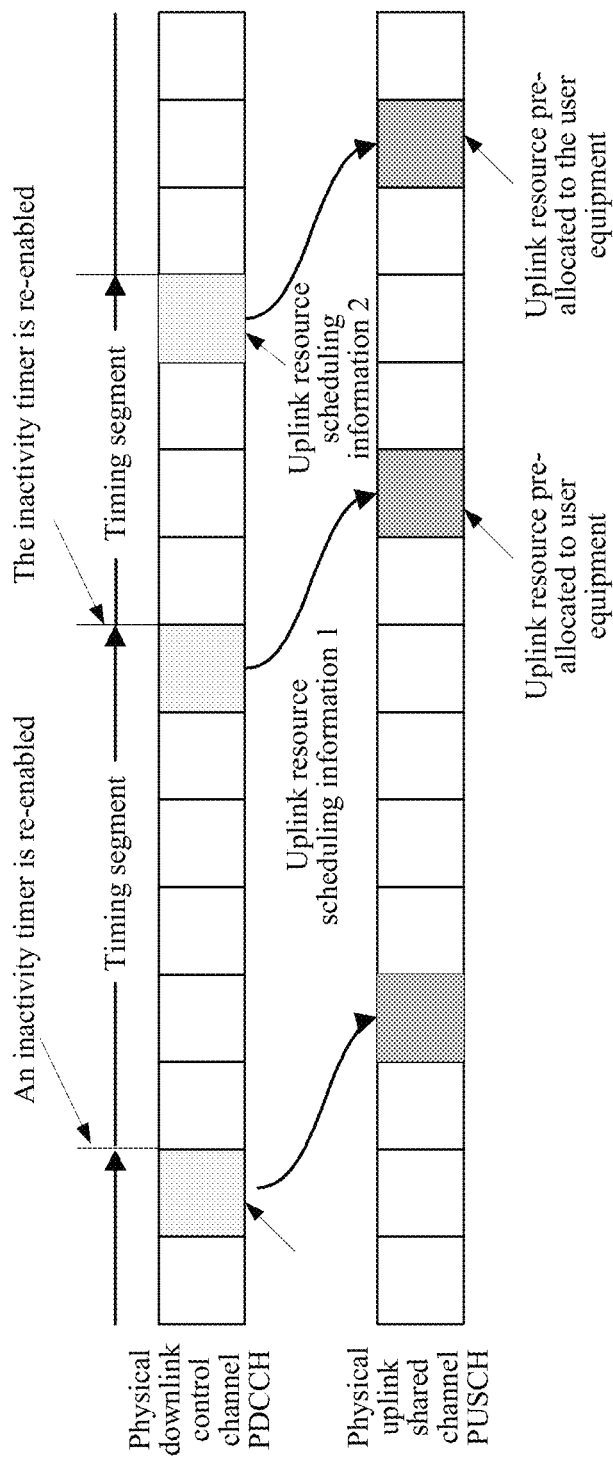
FIG. 8 is a schematic diagram of another embodiment of a resource scheduling method according to embodiments of this application.

As shown in FIG. 8, a description is provided by using an example in which the user equipment receives scheduling information indicating an uplink data resource. When the user equipment receives scheduling information that is sent by the access network device and that is used to indicate an uplink data resource, the user equipment enables the inactivity timer, and the access network device may send, before the inactivity timer expires, uplink resource scheduling information 1 to the user equipment by using the PDCCH and schedule an uplink resource for the user equipment.

It should be understood that, when the user equipment receives the uplink resource scheduling information 1, the inactivity timer is re-enabled to re-time. After the inactivity timer is re-enabled, the access network device may send, before the inactivity timer expires, uplink resource scheduling information 2 to the user equipment and schedule an uplink resource for the user equipment, so that the user equipment uses the uplink resource when needing to send data. In other words, in the embodiments of this application, the access network device may pre-schedule some uplink resources for the user equipment, provided that the user equipment is in the inactivity timer timing segment during scheduling, and details are not limited herein.

It should be noted that, FIG. 8 is a schematic diagram in which two times of scheduling in the embodiments of this application are described only as an example.

In the embodiments of this application, the access network device may determine the inactivity timer timing segment of the user equipment in the discontinuous reception state, send the uplink resource scheduling information to the user equipment, and schedule the uplink resource for the user equipment. In other words, when the user equipment generates uplink data unpredictable by the access network device, the user equipment may directly send the unpredictable uplink data or an SR or a BSR on the uplink resource indicated by the uplink resource scheduling information that is sent by the access network device to the user equipment by using the PDCCH in the inactivity timer timing segment, so that a quantity of times of applying for an uplink resource by using a random access process can be reduced, additional signaling overheads brought to the user equipment can be reduced, and power consumption of the user equipment can be reduced.

Figure 9:
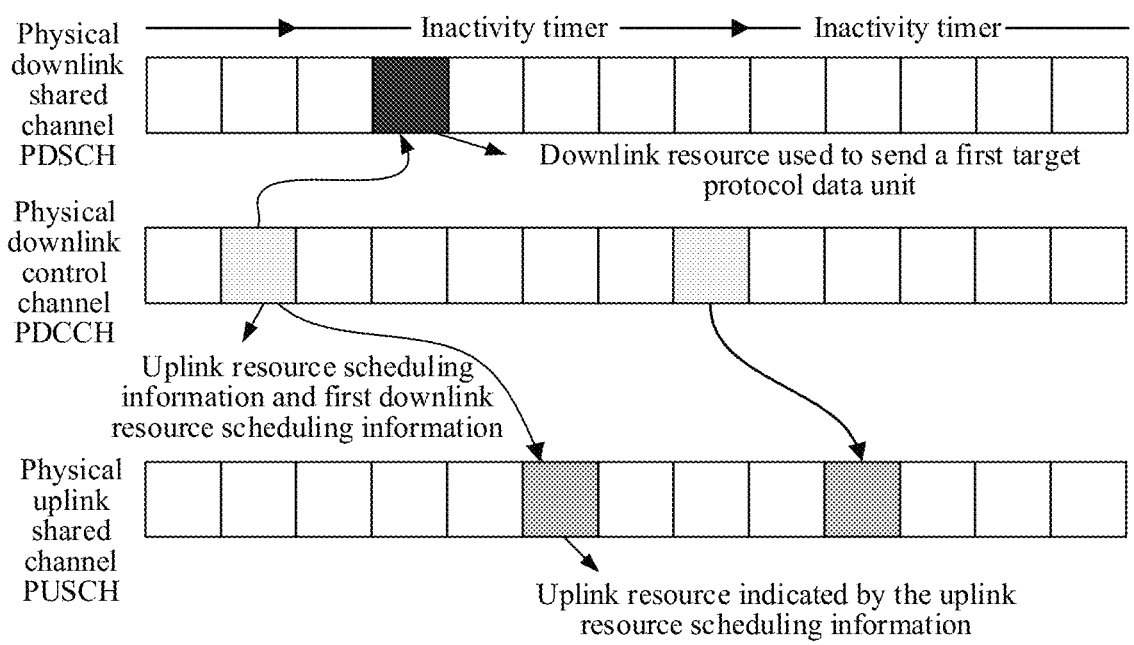
FIG. 9 is a schematic diagram of another embodiment of a resource scheduling method according to embodiments of this application.

In the embodiments of this application, optionally, as shown in FIG. 9, the access network device sends first downlink resource scheduling information to the user equipment by using a physical downlink control channel (PDCCH) in the inactivity timer timing segment, and sends the uplink resource scheduling information at the same time.

The first downlink resource scheduling information is scheduling information of a data block that includes a first target protocol data unit, and the first target protocol data unit is a last protocol data unit in downlink data that is sent by the access network device to the user equipment by using a physical downlink shared channel (PDSCH).

In other words, before sending the first target protocol data unit, the access network device schedules a downlink resource for the first target protocol data unit, and schedules an uplink resource for the user equipment at the same time.

It should be noted that, the first target protocol data unit may be an RLC protocol data unit, or may be a protocol data unit at any protocol layer above a physical layer, for example, a Media Access Control (MAC) layer protocol data unit, or a Packet Data Convergence Protocol (PDCP) layer protocol data unit. Details are not limited herein.

Optionally, in the embodiments of this application, before the access network device determines the inactivity timer timing segment of the user equipment, the method further includes:

sending, by the access network device, second downlink resource scheduling information to the user equipment by using a PDCCH, where the second downlink resource scheduling information is scheduling information of a data block that includes a second target protocol data unit, and the second target protocol data unit is a last protocol data unit in downlink data that is sent by the access network device to the user equipment.

That the access network device sends uplink resource scheduling information to the user equipment by using a PDCCH in the inactivity timer timing segment is specifically:

After receiving an answer message, the access network device sends, before the inactivity timer expires, the uplink resource scheduling information to the user equipment by using the PDCCH, where the answer message is fed back by the user equipment after receiving the second target protocol data unit. In other words, after the user equipment receives a last protocol data unit in the downlink data, the access network device schedules, before the inactivity timer expires, an uplink resource for the user equipment.

For ease of understanding and description, this embodiment of this application is described with reference to FIG. 10.

Figure 10:
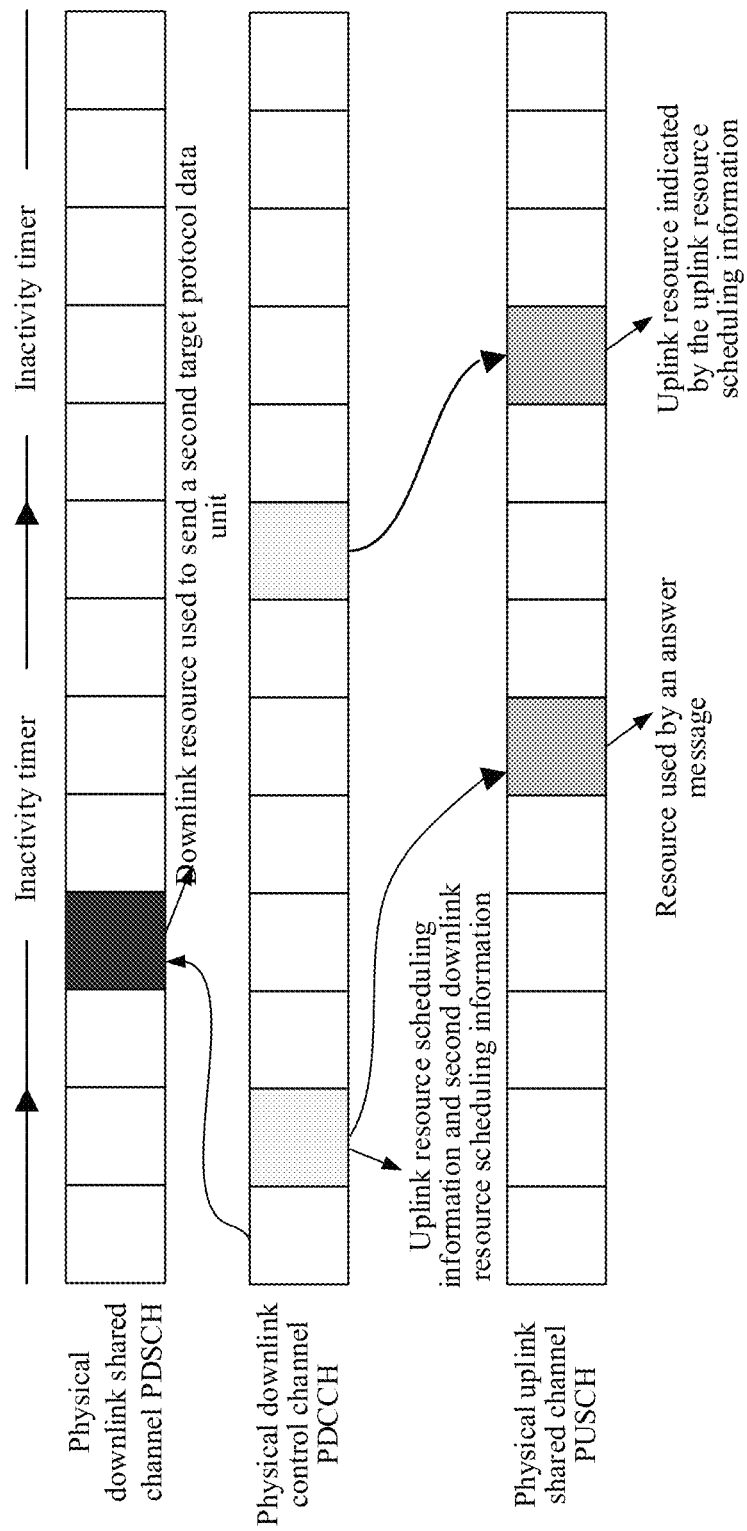
FIG. 10 is a schematic diagram of another embodiment of a resource scheduling method according to embodiments of this application.

As shown in FIG. 10, the access network device sends the second downlink resource scheduling information to the user equipment by using a PDCCH, and schedules a data block for the user equipment on the PDSCH. The data block is needed for receiving a last protocol data unit in downlink data. The access network device sends a second target protocol data unit to the user equipment on the data block, and when the user equipment receives the second target protocol data unit, the user equipment sends an answer message to the access network device.

When the user equipment receives downlink resource scheduling information sent by the access network device, the inactivity timer is enabled. In this case, after the access network device receives the answer message, the access network device sends, before the inactivity timer expires, the uplink resource scheduling information to the user equipment and schedules the uplink resource for the user equipment.

In the embodiments of this application, the access network device may determine the inactivity timer timing segment of the user equipment in the discontinuous reception state, send the uplink resource scheduling information to the user equipment, and schedule the uplink resource for the user equipment. In other words, when the user equipment generates uplink data unpredictable by the access network device, the user equipment may directly send the unpredictable uplink data or an SR or a BSR on the uplink resource indicated by the uplink resource scheduling information that is sent by the access network device to the user equipment by using the PDCCH in the inactivity timer timing segment, so that a quantity of times of applying for an uplink resource by using a random access process can be reduced, additional signaling overheads brought to the user equipment can be reduced, and power consumption of the user equipment can be reduced.

Embodiment 3

According to an resource scheduling method provided in the embodiments of this application, the access network device schedules an uplink resource for the user equipment by using a paging message when the user equipment is in an idle state.

Figure 11:
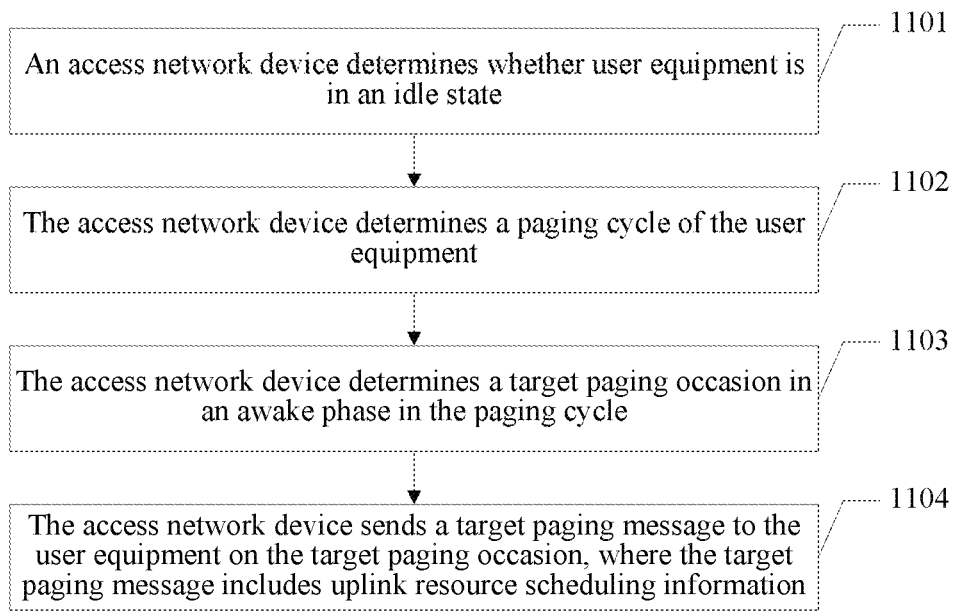
FIG. 11 is a schematic diagram of another embodiment of a resource scheduling method according to embodiments of this application.

Specifically, referring to FIG. 11, FIG. 11 is a schematic diagram of an embodiment of the resource scheduling method according to the embodiments of this application. A specific implementation process of the resource scheduling method includes the following steps.

1101. An access network device determines whether user equipment is in an idle state.

In the embodiments of this application, the access network device may determine whether the user equipment is in the idle state, that is, determine whether the user equipment is in an RRC_Idle state.

1102. The access network device determines a paging cycle of the user equipment.

In the embodiments of this application, when determining that the user equipment is in the idle state, the access network device further determines the paging cycle of the user equipment. The paging cycle may include one or more paging cycles of the user equipment, and details are not limited herein.

It should be understood that, the user equipment in the idle state wakes in each paging cycle, and monitors a PDCCH on a paging occasion (PO) only in a corresponding paging frame (Pf) in an awake phase of the paging cycle.

1103. The access network device determines a target paging occasion in an awake phase in the paging cycle.

In the embodiments of this application, when determining the paging cycle of the user equipment, the access network device may determine the target paging occasion in the awake phase of the paging cycle. The target paging occasion may include one or more paging occasions in the awake phase of the paging cycle. Details are not limited herein.

1104. The access network device sends a target paging message to the user equipment on the target paging occasion, where the target paging message includes uplink resource scheduling information.

In the embodiments of this application, after determining the target paging occasion in the awake phase in the paging cycle, the access network device may send the target paging message to the user equipment on the target paging occasion. The paging message includes the uplink resource scheduling information.

The access network device sends the uplink resource scheduling information to the user equipment by using the paging message, and schedules an uplink resource for the user equipment in the paging message.

It should be noted that, the access network device may periodically schedule an uplink resource for the user equipment in paging message. It should be noted that, a period for the access network device to schedule an uplink resource for the user equipment may be an integer multiple of the paging cycle of the user equipment.

In the embodiments of this application, the access network device may schedule the uplink resource for the user equipment in the paging message. In other words, when the user equipment generates data unpredictable by the access network device, the user equipment may directly send the unpredictable uplink data or an SR or a BSR on the uplink resource indicated by the uplink resource scheduling information that is sent by the access network device to the user equipment by using the paging message on the target paging occasion, so that a quantity of times of applying for an uplink resource by using a random access process can be reduced, additional signaling overheads brought to the user equipment can be reduced, and power consumption of the user equipment can be reduced.

Embodiment 4

Figure 12:
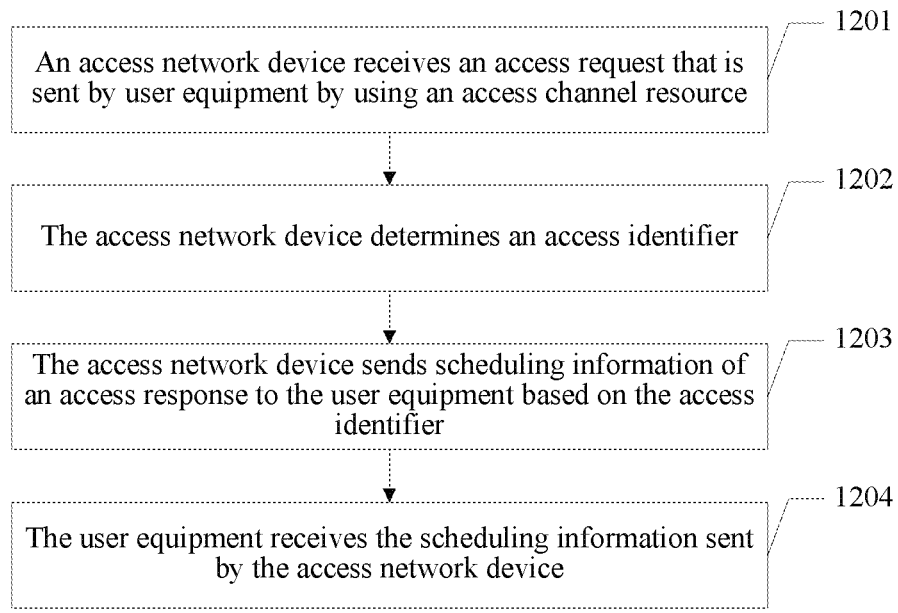
FIG. 12 is a schematic diagram of another embodiment of a resource scheduling method according to embodiments of this application.

For details of an resource scheduling method provided in the embodiments of this application, refer to FIG. 12. FIG. 12 is a schematic diagram of an embodiment of the resource scheduling method according to the embodiments of this application. The resource scheduling method includes the following steps.

1201. An access network device receives an access request that is sent by user equipment by using an access channel resource.

In the embodiments of this application, when needing to apply for a resource to send data, the user equipment may send an access request to the access network device, and the access network device may receive the access request that is sent by the user equipment by using a random access channel resource.

1202. The access network device determines an access identifier.

The access network device determines the access identifier based on at least one of frequency information and time information of the access channel resource.

It should be noted that the frequency information includes at least one of a frequency band identifier and a carrier identifier. The frequency band identifier refers to band_id, and a frequency band may include a plurality of subcarriers. Specifically, for example, the frequency band identifier may be a system narrowband identifier. A system narrowband may be a minimum frequency band supporting working of a system. For example, for an NB-IoT network, a bandwidth of a system narrowband may be 200 kHz (including a guard bandwidth of 20 kHz), and one system narrowband may be divided into 48 subcarriers of 3.75 kHz.

The system narrowband identifier may be an index of a system narrowband corresponding to an access channel resource selected by the user equipment. A system narrowband index range may start from 0 or 1, and no limitation is imposed herein. For example, the network may support at most five system narrowbands that may be used for random access. If the system narrowband index starts from 0, the system narrowband index range is 0 to 4, and x is a positive integer greater than or equal to 5. If the system narrowband index starts from 1, the system narrowband index range is 1 to 5, and x is a positive integer greater than or equal to 6.

It should be noted that for a conventional LTE network, a system bandwidth is 1.4 MHz to 20 MHz. In other words, a minimum operating bandwidth that can be configured for an LTE system bandwidth is 1.4 MHz.

For another example, the frequency band identifier may alternatively be an identifier of a set of configurable subcarriers. For example, for an NB-IoT network, when configuration is performed on a random access resource, a set including 12 consecutive subcarriers may be used as a unit. In other words, a quantity of configurable carriers may be 0, 12, 24, 36, or 48. Preferably, the frequency band identifier in the embodiments of the present application is a system narrowband identifier.

The time information includes at least one of an access channel resource period identifier, a system hyper frame number, and a system frame number.

It should be noted that, an access channel resource period may be specifically one of a minimum access channel resource period supported by an access network, a minimum access channel resource period that is currently activated by the access network device, or an access channel resource period corresponding to a coverage level of the user equipment. Details are not limited herein.

It should be understood that an objective of determining the access identifier is to indicate, by using the access identifier, an access resource used by the user equipment. Each part of resource on an access channel corresponds to resource parameters such as the frequency band identifier and the carrier identifier in the frequency information, and the access channel resource period identifier, the system hyper frame number, and the system frame number in the time information. One or several or all of the resource parameters may indicate the access resource used by the user equipment.

The access network device may determine the access identifier according to the following formula:

$$RA\text{-}RNTI = 1 + band\_id + x*(HSFN \bmod y) + x*y*Period\_id, \text{ where}$$

RA-RNTI is the access identifier, band_id is the frequency band identifier, HSFN is the system hyper frame number, and Period_id is the access channel resource period identifier; and x is a positive integer, x is greater than or equal to a maximum value of (1+band_id), and y is a quantity of system hyper frames that are covered by a maximum access response receiving window length supported by the access network.

In addition, the access identifier may alternatively be determined according to the following formula:

$$RA\text{-}RNTI = 1 + (HSFN \bmod y) + y*Period\_id, \text{ where}$$

y is a quantity of system hyper frames that are covered by a maximum access response receiving window length supported by the access network.

It should be noted that an objective of determining the access identifier is to indicate, by using the access identifier, an access resource used by the user equipment. Each part of resource on an access channel corresponds to resource parameters such as the frequency band identifier and the carrier identifier in the frequency information, and the access channel resource period identifier, the system hyper frame number, and the system frame number in the time information. One or several or all of the resource parameters may indicate the access resource used by the user equipment.

Because space reserved by the access network for each identifier is usually fixed, a relatively large access identifier affects configuration performed by the access network on another access identifier. Therefore, any combination including the resource parameters such as the frequency band identifier, the carrier identifier, the access channel resource period identifier, the system hyper frame number, and the system frame number may be selected based on features and requirements of the access network, to determine the access identifier. The access identifier may further be determined in the following manners:

Manner 1:

$$RA\text{-}RNTI = 1 + band\_id + x*Period\_id, \text{ where}$$

RA-RNTI is the access identifier, band_id is the frequency band identifier, HSFN is the system hyper frame number, and Period_id is the access channel resource period identifier; and x is a positive integer, and x is greater than or equal to a maximum value of (1+band_id).

Manner 2:

$$RA\text{-}RNTI = 1 + band\_id + x*SFN, \text{ where}$$

RA-RNTI is the access identifier, band_id is the frequency band identifier, HSFN is the system hyper frame number, and SFN is the system frame number.

It should be noted that in the foregoing Manner 1 and Manner 2, if a maximum access response receiving window length Wmax is relatively short, transformation may be performed on Period_id and SFN in the formula, to further reduce a maximum value of the access identifier. A specific method is as follows:

In Manner 1, Period_id in the formula is replaced with Period_id mod (floor(Wmax/Period)+1) or Period_id mod floor(Wmax/Period). Period is the access channel resource period.

In Manner 2, SF in the formula is replaced with SFN mod (floor(Wmax/SFN_Length)+1) or SFN mod floor(Wmax/SF_Length). SF_Length is a system frame length. For example, in an LTE system, an SF_Length length is 10 ms.

In addition to the Manner 1 and Manner 2, the system hyper frame number may further be introduced, to avoid confusion caused when two user equipments receive access responses by using a same access identifier in an overlapped part of their response receiving windows. For example, in manner 3:

$$RA\text{-}RNTI = 1 + band\_id + x*(HSFN \bmod y) + x*y*SFN, \text{ where}$$

RA-RNTI is the access identifier, band_id is the frequency band identifier, HSFN is the system hyper frame number, and SFN is the system frame number; and x is a positive integer, x is greater than or equal to a maximum value of (1+band_id), and y is a quantity of system hyper frames that are covered by a maximum access response receiving window length supported by the access network.

In the embodiments of this application, the system hyper frame number is introduced, to avoid confusion caused when two user equipments receive access responses by using a same access identifier in an overlapped part of their response receiving windows.

Manner 4:

$$RA\text{-}RNTI = 1 + (HSFN \bmod y) + y*SFN, \text{ where}$$

RA-RNTI is the access identifier, band_id is the frequency band identifier, HSFN is the system hyper frame number, and SFN is the system frame number.

It should be noted that in the foregoing several manners of determining the access identifier, y may be specifically determined according to the following formula:

$$y = floor(Wmax/HSF\text{-}Length) + 1$$

It should be noted that, y may be alternatively determined in another manner:

for example, y=floor(Wmax/HSF-Length), and details are not limited herein.

floor( ) represents rounding down, Wmax is a maximum access response receiving window length, and HSF-Length is a system hyper frame length.

It should be noted that, in a possible design, in the foregoing manners of determining the access identifier, the access network device determines the access channel resource period identifier according to the following formula:

$$Period\_id = floor(SFN/Period), \text{ where}$$

Period_id is the access channel resource period identifier, SFN is the system frame number, and Period is the access channel resource period and uses a system frame as a unit.

It should be noted that, in all manners of determining the access identifier, meaning of HSFN mod y lies in that when the maximum access response window length does not cover all hyper frames, the maximum value of the access identifier can be decreased by using a mod operation. If an access network system does not need to decrease the maximum value of the access identifier, or may accept a relatively large value of the access identifier, this operation may not be performed. In other words, HSFN mod y may be replaced with HSFN.

It should be noted that, when the access identifier is determined by using a plurality of resource parameters, the formula is in a form of respectively multiplying the plurality of resource parameters by corresponding coefficients and adding products. Essence lies in that different resource parameters are placed at different locations of the access identifier to be distinguished from each other. An occurrence sequence of different resource parameters in the formula is that generally, a resource parameter having a small maximum value occurs first, and a resource parameter having a large maximum value occurs subsequently, so that the maximum value of the access identifier is as small as possible. However, this application is not limited to this ranking manner. The following describes how a coefficient of each resource parameter is determined when the access identifier is determined by using a plurality of resource parameters. A general formula of the access identifier may be represented as:

RA-RNTI=1+a coefficient 1*a resource parameter 1+a coefficient 2*a resource parameter 2+ . . . +a coefficient n*a resource parameter n, where RA-RNTI is the access identifier and may have n resource parameters. Coefficient setting rules are as follows:

all coefficients are positive integers;

the coefficient 1 is a coefficient of the left-most resource parameter 1 in the formula, and the coefficient 1 is required to be greater than or equal to 1;

the coefficient 2 is greater than or equal to (a maximum value of the resource parameter 1+1)*the coefficient 1;

a coefficient 3 is greater than or equal to (a maximum value of the resource parameter 2+1)*the coefficient 2; and by analogy, a coefficient n is greater than or equal to (a maximum value of a resource parameter (n−1)+1)*a coefficient (n−1).

It should be noted that, the access channel resource period is a minimum access channel resource period supported by the access network, a minimum access channel resource period that is currently activated by the access network device, or an access channel resource period corresponding to a coverage level of the user equipment.

1203. The access network device sends scheduling information of an access response to the user equipment based on the access identifier.

In the embodiments of this application, after the access network device determines the access identifier, the access network device may send the scheduling information of the access response to the user equipment based on the access identifier, that is, a scheduling message of a media access control (MAC) random access response (RAR) protocol data unit (PDU).

Persons skilled in the art may know that, considered from the perspective of components of a MAC PDU of an RAR, a MAC RAR PDU includes a message header and a message payload. The message header of the MAC RAR PDU includes one or more sub-access response (MAC RAR) subheaders. The message payload of the MAC RAR PDU includes one or more sub-access response (MAC RAR) payloads and a padding that may exist. There is a correspondence between each sub-access response subheader and each sub-access response (MAC RAR) payload. For example, one subheader may be corresponding to one payload. It may be learned from the above-described structure that one MAC PDU may include a plurality of MAC RARs.

It should be understood that, specifically, the access identifier may be scrambled into the scheduling information of the access response, and details are not described herein again.

1204. The user equipment receives the scheduling information sent by the access network device.

In the embodiments of this application, the user equipment may receive the scheduling information sent by the access network device, and the user equipment receives, on a resource indicated by the scheduling information, the access response (MAC RAR PDU) sent by the access network device.

It should be noted that, when the user equipment sends an access request, the user equipment determines the access identifier based on the access channel resource used by the user equipment. A specific method for determining the access identifier by the user equipment is similar to the foregoing method for determining the access identifier by the access network device, and details are not described herein again.

The user equipment receives the scheduling information by using the access identifier. When the access identifier used by the access network device to send the scheduling information matches the access identifier used by the user equipment, the user equipment can successfully receive the scheduling information, and receive the access response (MAC RAR PDU) of the access network device on the resource indicated by the scheduling information. Subsequently, the user equipment performs matching between access channel resource information used by the user equipment, for example, system narrowband information or sub-carrier information, and information included in each sub-access response (MAC RAR) in the access response (MAC RAR PDU). When the access channel resource information matches the information included in each sub-access response (MAC RAR), it indicates that the MAC RAR is a MAC RAR of the user equipment. After the user equipment identifies which MAC RAR is destined for the user equipment, the user equipment may further perform a subsequent accessing step by using related configurations, parameters, and the like in the identified matched MAC RAR. Details are not described herein again.

In the embodiments of this application, when the user equipment generates uplink data unpredictable by the access network device, the user equipment may apply for an uplink resource by using an access channel resource. A larger time unit, for example, an access period and a hyper frame number, is introduced, whose objective is to distinguish between different user equipments that send access requests by using different access channel resources, avoiding a problem of confusion caused when different user equipments decode a PDCCH based on a same access identifier in overlapped access response receiving windows.

It should be noted that, in some embodiments of the present application, after the access network device sends the scheduling information of the access response to the user equipment based on the access identifier, the access network device sends an access response (MAC RAR PDU) based on the scheduling information. The MAC RAR PDU includes the frequency band identifier, and the frequency band identifier may be included in a message header or included in a message payload of the MAC RAR PDU. Specifically, a sub-access response subheader includes the frequency band identifier of the access request that is received by the access network device, or a sub-access response payload includes the frequency band identifier of the access request that is received by the access network device.

Figure 13:
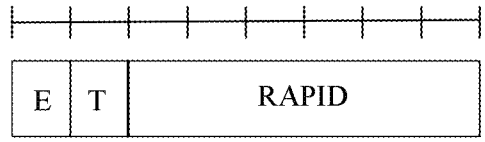
FIG. 13 is a schematic diagram of a frequency band identifier carrying manner in a resource scheduling method according to an embodiment of this application.
Figure 13:
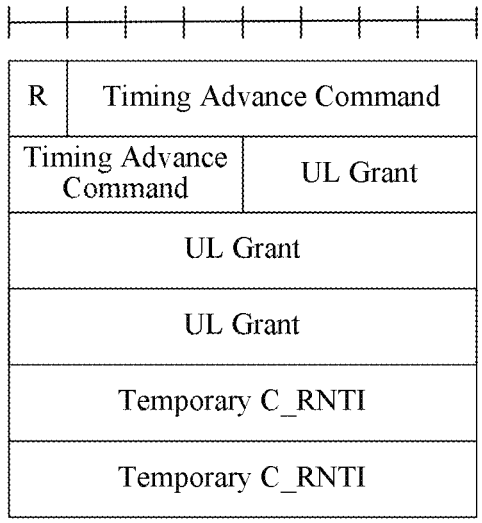
Figure 13:
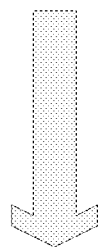
Figure 13:
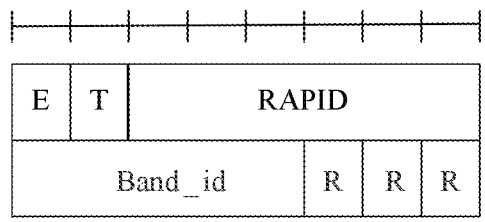
Figure 13:
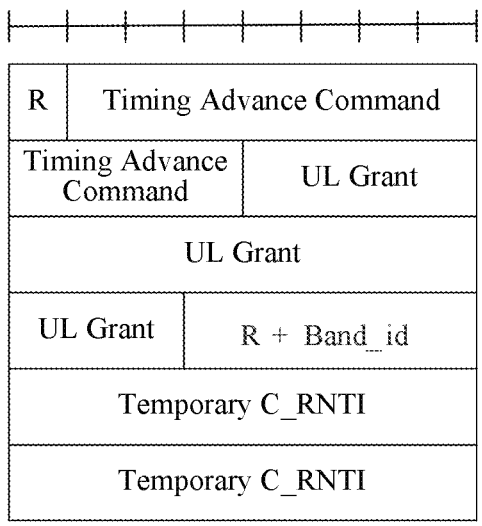

As shown FIG. 13, when the sub-access response subheader includes the frequency band identifier, several bits of the frequency band identifier may be added to the existing sub-access response subheader, that is, five bits after an RAPID field are used as a frequency band identifier field. When the sub-access response payload includes the frequency band identifier, reserved bits of the existing sub-access response payload may be used to indicate the frequency band identifier. There are five R reserved bits beside an uplink resource (UL Grant) field, and some of the reserved bits may be used as the frequency band identifier. It should be noted that, in any manner, a quantity of bits occupied by the frequency band identifier depends on a maximum quantity of frequency bands that can be used in a network. For example, if a network can support 16 frequency bands at most, the frequency band identifier needs to occupy at least four bits. In addition, it should be noted that, a carrying manner of the frequency band identifier shown in FIG. 13 is used merely as an example for description, but does not constitute a limitation on this embodiment of the present application.

It should be understood that, NB-IoT of a REL(Release)-14 version supports a multi-system narrowband, that is, the user equipment is allowed to perform random access on different random access resources on a plurality of system narrowbands, so that an access capacity is increased. Different user equipments are allowed to initiate random access on different uplink system narrowbands of 200 kHz. In the solutions described above, because most access identifiers do not include information used to distinguish between system narrowbands, on different system narrowbands, user equipments that simultaneously use a same subcarrier index to send access requests share a same MAC RAR, and subsequent contention resolution cannot be performed. Therefore, a core point of this embodiment of the present application lies in that, even in a case of a multi-system narrowband, when the user equipments send access requests on different system narrowbands, and even if the user equipments select a same subcarrier index, each user equipment can still identify its own MAC RAR, so that efficient contention resolution can be performed.

The foregoing describes the resource scheduling method in the embodiments of this application, and the following describes the access network device in the embodiments of this application.

Figure 14:
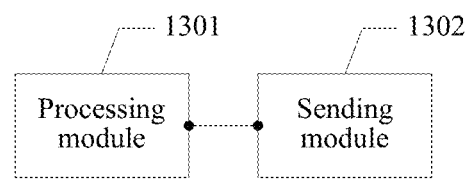
FIG. 14 is a schematic diagram of an embodiment of an access network device according to embodiments of this application.

Specifically referring to FIG. 14, FIG. 14 shows an embodiment of the access network device in this application. The access network device includes a processing module 1301 and a sending module 1302.

The processing module 1301 is configured to determine a target time interval in which user equipment monitors a downlink control channel.

The sending module 1302 is configured to send uplink resource scheduling information to the user equipment by using the downlink control channel in the target time interval.

It should be noted that with reference to the foregoing embodiments, for functions of or steps performed by the processing module 1301 and the sending module 1302, refer to corresponding processes in the foregoing method embodiments, and details are not described herein again.

Figure 15:
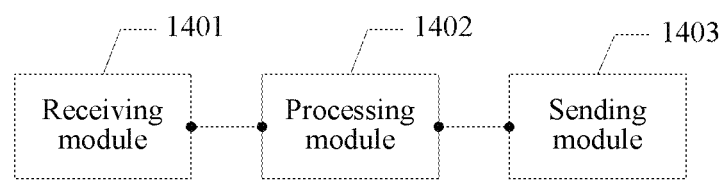
FIG. 15 is a schematic diagram of another embodiment of an access network device according to embodiments of this application.

Referring to FIG. 15, FIG. 15 shows another embodiment of the access network device in this application. The access network device includes a receiving module 1401, a processing module 1402, and a sending module 1403.

The receiving module 1401 is configured to receive an access request that is sent by user equipment by using an access channel resource.

The processing module 1402 is configured to determine an access identifier based on at least one of time information and frequency information of the access channel resource.

The frequency information includes at least one of a frequency band identifier and a carrier identifier.

The time information includes at least one of an access channel resource period identifier, a system hyper frame number, and a system frame number.

The sending module 1403 is configured to send scheduling information of an access response to the user equipment based on the access identifier, so that the user equipment receives the access response on a resource indicated by the scheduling information.

Figure 16:
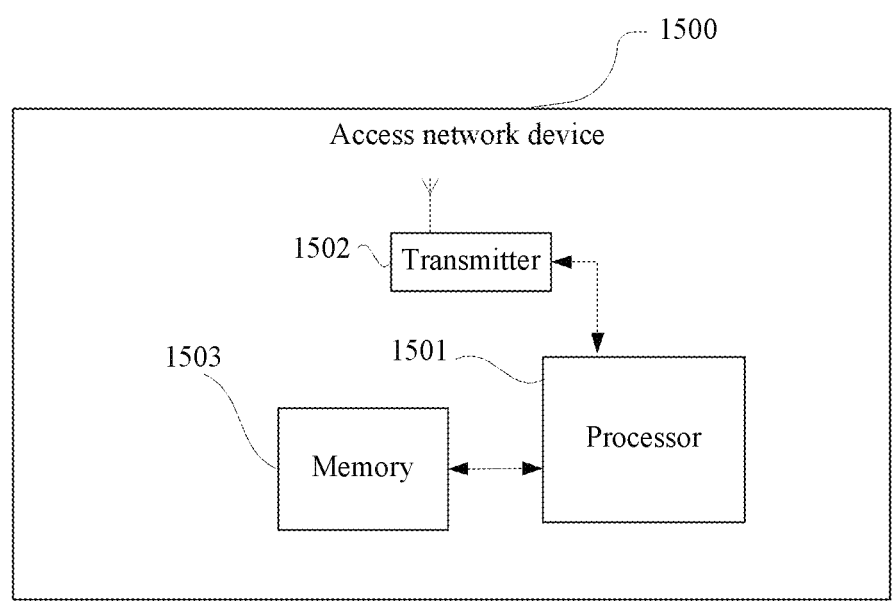
FIG. 16 is a schematic diagram of another embodiment of an access network device according to embodiments of this application.

The foregoing describes the access network device in the embodiments of this application from the perspective of modular functions, and the following describes the access network device in the embodiments of this application from the perspective of hardware processing. As shown in FIG. 15, for ease of description, only parts related to the embodiments of this application are shown, and for specific technical details not disclosed, refer to corresponding method parts in the embodiments of this application. Referring to FIG. 16, FIG. 16 is a schematic structural diagram of the access network device according to an embodiment of this application.

The access network device 1500 includes: a physical apparatus processor 1501 corresponding to the processing module, and a transmitter 1502 corresponding to the sending module in the foregoing embodiment. The access network device further includes a memory 1503, configured to store program code, and when the program code is executed by the processor 1501, the methods of the foregoing embodiments in this application can be implemented. Persons skilled in the art may understand that a structure of the access network device shown in FIG. 16 does not constitute a limitation on the access network device, and the access network device may include more or fewer components than those shown in the figure, or some components may be combined, or a different component arrangement may be used.

For details of steps performed by the access network device in this embodiment, refer to corresponding processes of the foregoing embodiments, and details are not described herein again.

Figure 17:
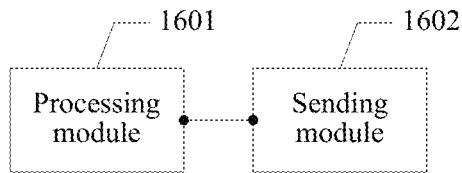
FIG. 17 is a schematic diagram of an embodiment of user equipment according to embodiments of this application.

The foregoing describes the access network device in the embodiments of this application, and the following describes the user equipment in the embodiments of this application. Refer to FIG. 17, FIG. 17 is a schematic diagram of an embodiment of the user equipment according to the embodiments of this application. The user equipment includes a processing module 1601 and a sending module 1602.

The processing module 1601 is configured to: determine whether the user equipment generates specific uplink data; and if the user equipment generates the specific uplink data, enable a specific timer.

The sending module 1602 is configured to: if receiving, before the specific timer expires, uplink resource scheduling information sent by an access network device, send target data to the access network device on an uplink resource indicated by the uplink resource scheduling information.

The uplink resource scheduling information is sent by the access network device by using a downlink control channel in a target time interval, and the target time interval is a time segment in which the user equipment monitors the downlink control channel.

Figure 18:
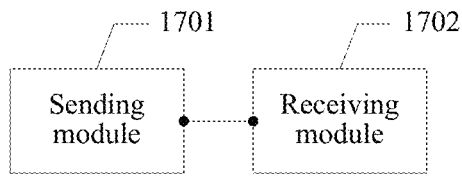
FIG. 18 is a schematic diagram of another embodiment of user equipment according to embodiments of this application.

Referring to FIG. 18, FIG. 18 is a schematic diagram of an embodiment of the user equipment according to the embodiments of this application. The user equipment includes a sending module 1701 and a receiving module 1702.

The sending module 1701 is configured to send an access request to an access network device by using an access channel resource.

The receiving module 1702 is configured to receive scheduling information that is of an access response and that is sent by the access network device.

The scheduling information is sent by the access network device based on an access identifier.

The access identifier is determined based on frequency information and/or time information of the access channel resource.

The frequency information includes at least one of a frequency band identifier and a carrier identifier.

The time information includes at least one of an access channel resource period identifier, a system hyper frame number, and a system frame number.

The user equipment further includes a module, configured to determine the access identifier based on the time information and the frequency information of the access channel resource, or the time information of the access channel resource.

Figure 19:
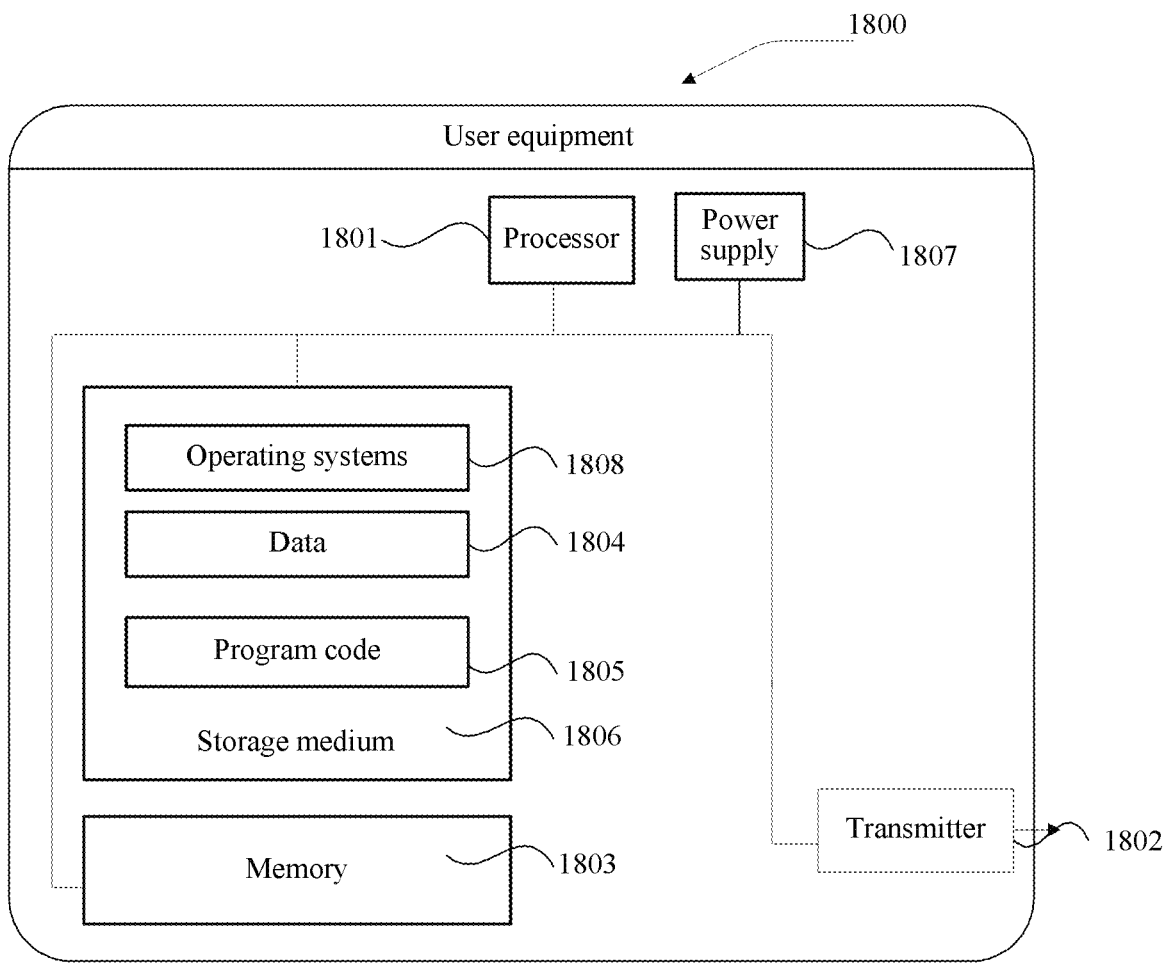
FIG. 19 is a schematic diagram of another embodiment of user equipment according to embodiments of this application.

The foregoing describes the user equipment in the embodiments of this application from the perspective of modular functions, and the following describes the user equipment in the embodiments of this application from the perspective of hardware processing. Referring to FIG. 19, FIG. 19 is a schematic structural diagram of the user equipment according to the embodiments of this application. The user equipment 1800 may differ greatly due to different configurations or performance, and may include, for example, one or more physical apparatus processors 1801 (for example, one or more processors) corresponding to the processing module in the foregoing embodiments, a physical apparatus transmitter 1802 corresponding to the sending module in the foregoing embodiments, a memory 1803, one or more pieces of data 1804, or a storage medium 1806 (for example, one or more mass storage devices) storing program code 1805. The memory 1803 and the storage medium 1806 may be transient or persistent storages. The program stored in the storage medium 1806 may include one or more modules (not shown in the figure), and each module may include a series of instruction operations in a terminal device. Furthermore, the one or more physical apparatus processors 1801 may be configured to communicate with the storage medium 1806, and perform, on the user equipment 1800, the series of instruction operations in the storage medium 1806.

The user equipment 1800 may further include one or more power supplies 1807 and one or more operating systems 1808.

For details of steps performed by the user equipment in this embodiment, refer to corresponding processes of the foregoing method embodiments, and details are not described herein again.

It should be noted that, processors used in the foregoing apparatus embodiments may be a central processing unit (CPU) or a network processor (NP), or a combination of a CPU and an NP.

The processor may further include a hardware chip, which may be specifically an application-specific integrated circuit (ASIC) or a programmable logic device (PLD), or a combination thereof. In addition, the PLD may be a complex programmable logical device (CPLD), a field-programmable gate array (FPGA), or generic array logic (GAL), or any combination thereof. This is not limited in the present application.

In the several embodiments provided in this application, it should be understood that the disclosed system, module, and method may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional modules in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated module is implemented in a form of a software functional unit and sold or used as an independent product, the integrated module may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A resource scheduling method performed by a user equipment in a communication system, the method comprising:
   sending an access request to an access network device using an access channel resource;
   determining a random access radio network temporary identifier (RA-RNTI) based on floor(SFN/Period), wherein
   the SFN is a system frame number, the Period is a minimum access channel resource period, and the floor ( ) represents rounding down; and
   receiving, based on the RA-RNTI, scheduling information of an access response from the access network device.

2. The resource scheduling method according to claim 1, wherein the method further comprises:
   receiving, based on the scheduling information, the access response from the access network device, wherein the access response comprises a narrowband identifier, wherein the narrowband identifier is comprised in a message header of the access response or a message payload of the access response.

3. The resource scheduling method according to claim 1, wherein the RA-RNTI is used to scramble the scheduling information of the access response.

4. The resource scheduling method according to claim 1, wherein the determining the RA-RNTI based on the floor (SFN/Period) comprises:
   determining the RA-RNTI according to:

RA-RNTI=1+a coefficient 1*floor(SFN/Period), wherein, the coefficient 1 is equal to 1.

5. An apparatus, comprising:
   a memory storing program instructions; and
   a processor coupled to the memory, wherein when executed by the processor, the instructions cause the apparatus to:
   send an access request to an access network device using an access channel resource;
   determine a random access radio network temporary identifier (RA-RNTI) based on floor(SFN/Period), wherein
   the SFN is a system frame number, the Period is a minimum access channel resource period, and the floor ( ) represents rounding down; and
   receive, based on the RA-RNTI, scheduling information of an access response from the access network device.

6. The apparatus according to claim 5, wherein the apparatus is a user equipment.

7. The apparatus according to claim 5, wherein the instructions, when executed by the processor, further cause the apparatus to:
   receive the access response based on the scheduling information, wherein the access response comprises a narrowband identifier, wherein the narrowband identi-fier is comprised in a message header of the access response or a message payload of the access response.

8. The apparatus according to claim 5, wherein the RA-RNTI is used to scramble the scheduling information of the access response.

9. The apparatus according to claim 5, wherein the instructions cause the apparatus to determine the RA-RNTI according to:

RA-RNTI=1+a coefficient 1*floor(SFN/Period), wherein the coefficient 1 is equal to 1.

10. A resource scheduling method performed by an access network device, the method comprising:
    receiving an access request on an access channel resource from a user equipment;
    determining a random access radio network temporary identifier (RA-RNTI) based on floor(SFN/Period), wherein
    the SFN is a system frame number, the Period is a minimum access channel resource period, and the floor ( ) represents rounding down; and
    sending, based on the RA-RNTI, scheduling information of an access response to the user equipment.

11. The resource scheduling method according to claim 10, wherein the method further comprises:
    sending the access response, wherein the access response comprises a narrowband identifier, wherein the narrowband identifier is comprised in a message header of the access response or a message payload of the access response.

12. The resource scheduling method according to claim 10, wherein the RA-RNTI is used to scramble the scheduling information of the access response.

13. The resource scheduling method according to claim 10, wherein the determining the RA-RNTI based on the floor(SFN/Period) comprises:
    determining the RA-RNTI according to:

RA-RNTI=1+a coefficient 1*floor(SFN/Period), wherein, the coefficient 1 is equal to 1.

14. An apparatus, comprising:
    a memory storing program instructions; and
    a processor coupled to the memory, wherein when executed by the processor, the instructions cause the apparatus to:
    receive an access request on an access channel resource from a user equipment;
    determine a random access radio network temporary identifier (RA-RNTI) based on floor(SFN/Period), wherein
    the SFN is a system frame number, the Period is a minimum access channel resource period, and the floor ( ) represents rounding down; and
    send, based on the RA-RNTI, scheduling information of an access response to the user equipment.

15. The apparatus according to claim 14, wherein the instructions, when executed by the processor, further cause the apparatus to:
    send the access response, wherein the access response comprises a narrowband identifier, wherein the narrowband identifier is comprised in a message header of the access response or a message payload of the access response.

16. The apparatus according to claim 14, wherein the RA-RNTI is used to scramble the scheduling information of the access response.

17. The apparatus according to claim 14, wherein the instructions, when executed by the processor, cause the apparatus to determine the RA-RNTI according to:

$$\text{RA-RNTI} = 1 + a\ \text{coefficient}\ 1 * \text{floor}(\text{SFN}/\text{Period}),$$

wherein the coefficient 1 is equal to 1.

* * * * *